(12) United States Patent
Shanmugaraju et al.

(10) Patent No.: US 11,784,696 B2
(45) Date of Patent: Oct. 10, 2023

(54) BEAM TRACKING IN A BASE STATION

(71) Applicant: CommScope Technologies LLC, Hickory, NC (US)

(72) Inventors: Naveen Shanmugaraju, Bangalore (IN); Balaji B Raghothaman, Chester Springs, PA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/368,061

(22) Filed: Jul. 6, 2021

(65) Prior Publication Data
US 2022/0052737 A1 Feb. 17, 2022

Related U.S. Application Data

(60) Provisional application No. 63/066,695, filed on Aug. 17, 2020.

(51) Int. Cl.
*H04B 7/06* (2006.01)
*H04W 56/00* (2009.01)

(52) U.S. Cl.
CPC ......... *H04B 7/0632* (2013.01); *H04B 7/0617* (2013.01); *H04B 7/0626* (2013.01); *H04W 56/001* (2013.01)

(58) Field of Classification Search
CPC .................................................. H04B 7/0632
USPC ....................................................... 375/267
See application file for complete search history.

(56) References Cited

U.S. PATENT DOCUMENTS

| 2015/0244430 | A1 | 8/2015 | Shattil | |
|---|---|---|---|---|
| 2017/0303265 | A1 | 10/2017 | Islam et al. | |
| 2019/0045494 | A1* | 2/2019 | Ho | H04W 72/042 |
| 2019/0387440 | A1* | 12/2019 | Yiu | H04W 36/165 |
| 2020/0119844 | A1* | 4/2020 | Abotabl | H03M 13/09 |

(Continued)

FOREIGN PATENT DOCUMENTS

KR    1020060096692 A    9/2006

OTHER PUBLICATIONS

International Searching Authority, "International Search Report and Written Opinion from PCT Application No. PCT/US2021/040462", from Foreign Counterpart to U.S. Appl. No. 17/368,061, filed Sep. 29, 2021, pp. 1 through 13, Published: WO.

(Continued)

*Primary Examiner* — Lihong Yu
(74) *Attorney, Agent, or Firm* — Fogg & Powers LLC

(57) ABSTRACT

A system includes remote unit(s) (RU(s)). The RU(s) is/are configured to transmit at least one signal on a plurality of different beam patterns, each beam pattern comprising an active subset an inactive subset of a plurality of fine beams covering an area of a cell. The RU(s) is/are also configured to receive, from each of a plurality of user equipment (UEs) in the area, a respective signal strength measurement for each of the plurality of different beam patterns. The system also includes a centralized unit communicatively coupled to the plurality of RUs via a fronthaul interface. The centralized unit is configured to determine a bit vector for each UE based on a combination of the signal strength measurements from the respective UE. The centralized unit is configured also to select a respective fine beam for each UE based on the respective bit vector for the UE.

36 Claims, 13 Drawing Sheets

(56) References Cited

U.S. PATENT DOCUMENTS

2022/0224290 A1* 7/2022 Li ............................ H03F 1/32

OTHER PUBLICATIONS

O-RAN, "O-RAN Alliance Working Group 4 Management Plane Specification", ORAN.WG4.MP.0-v04.00 Technical Specification, Jul. 2020, pp. 1 through 184, O-RAN.
O-RAN, "O-RAN Fronthaul Working Group; Control, User and Synchronization Plane Specification", O-RAN.WG4.CUS.0-v04.00 Technical Specification, Jul. 2020, pp. 1 through 259, O-RAN.
"1. Table of general binary codes", downloaded from the internet Jul. 8, 2020, pp. 1 through 3.

* cited by examiner

BEAM TRACKING IN A BASE STATION

CROSS-REFERENCE TO RELATED APPLICATIONS

This application claims priority to U.S. Provisional Patent Application No. 63/066,695 titled "BEAM TRACKING IN A BASE STATION" and filed on Aug. 17, 2020, which is incorporated by reference in its entirety.

BACKGROUND

A centralized or cloud radio access network (C-RAN) can be used to implement base station functionality that is used to provide wireless service to items of user equipment (UE). Typically, for each cell implemented by a C-RAN, one or more baseband units (BBUs) interact with multiple remote units (RUs). Each BBU is coupled to the RUs over fronthaul communication links or a fronthaul network. It may be desirable to implement beam tracking in a base station (e.g., a 5G C-RAN).

SUMMARY

A system includes remote unit(s) (RU(s)). The RU(s) is/are configured to transmit at least one signal on a plurality of different beam patterns, each beam pattern comprising an active subset an inactive subset of a plurality of fine beams covering an area of a cell. The RU(s) is/are also configured to receive, from each of a plurality of user equipment (UEs) in the area of the cell, a respective signal strength measurement for each of the plurality of different beam patterns. The system also includes a central unit communicatively coupled to the plurality of RUs via a fronthaul interface. The central unit is configured to determine a bit vector for each UE based on a combination of the signal strength measurements from the respective UE. The central unit is configured also to select a respective fine beam for each UE based on the respective bit vector for the UE.

DRAWINGS

Understanding that the drawings depict only exemplary configurations and are not therefore to be considered limiting in scope, the exemplary configurations will be described with additional specificity and detail through the use of the accompanying drawings, in which.

Figure 1:
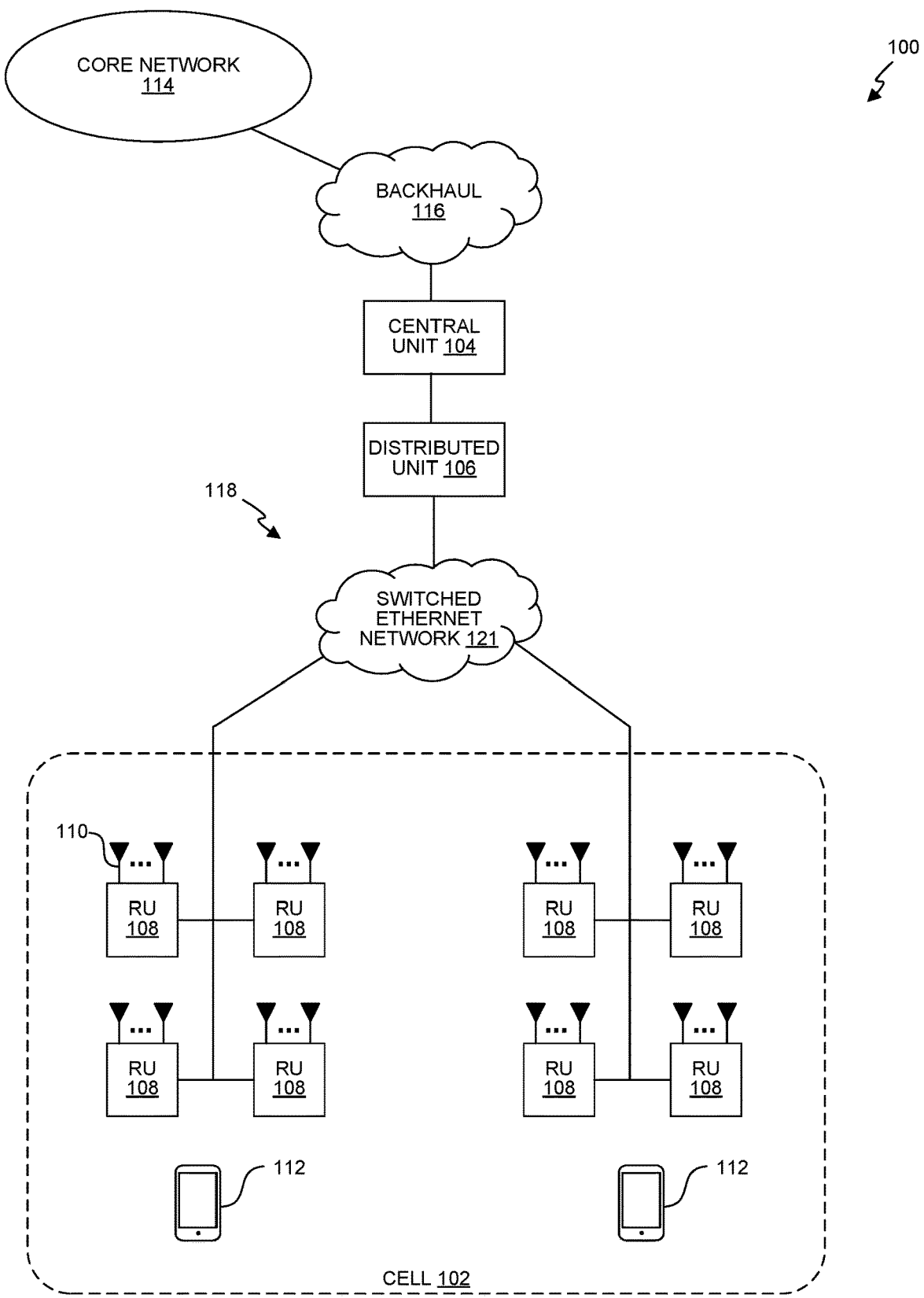
FIG. 1 is a block diagram illustrating one exemplary embodiment of a radio access network (RAN) system in which the techniques described here for beam tracking can be used.

In accordance with common practice, the various described features are not drawn to scale but are drawn to emphasize specific features relevant to the exemplary configurations.

DETAILED DESCRIPTION

Beamforming is used in millimeter wave (mmWave)-based 5G-NR (or simply "5G") systems, and analog or hybrid beamforming is the de-facto implementation given the cost of a fully-digital beamforming implementation. While high-level mechanisms are supported in the standards specifications, details of beam-management (e.g., how to select the fine beams for UEs) are left to implementation.

A cell can be "covered" by N (e.g., 16, 64, 256, etc.) directional fine beams. Selecting a fine beam for a UE in a cell is similar to the problem of UE location tracking since each fine beam is directed to a particular sub-area of the cell area.

One brute force technique of fine beam selection includes a base station "sweeping" a cell area by sequentially transmitting signals (e.g., Synchronization Signal Blocks (SSBs)) using each fine beam in a respective time resource. Each UE then reports signal strength measurements of the signal (e.g., in Channel State Information (CSI) reports), and the fine beam associated with the strongest of a UE's signal strength measurements is chosen for the UE. However, all the physical resource blocks (PRBs) of a given symbol can only be transmitted and/or received using a single fine beam, in a system that uses analog beamforming. Therefore, using all N fine beams for beam tracking reduces throughput of the base station because it monopolizes more time resources in the airlink than would otherwise be justified by actual UE demand. For example, in the brute force approach, a cell area covered by 64 fine beams would transmit a signal using a different fine beam in 64 different time resources to select a fine beam, e.g., N transmissions, each using a respective fine beam and in a respective time resource.

Other methods for beam selection include hierarchical tracking procedures where coarse beam measurements are taken at a UE, followed by measurements on finer beams that are set up based on the results of the coarse beam measurements. Measurement configuration management is generally more complex in such methods, and they may require the transmission of UE-specific signals, which is complex to implement. For example, UE's need to be configured so they know which reference signals to measure, how often to report these measurements, and how to report these measurements. With hierarchical tracking methods, such configuration depends on the results of previous measurements, which can make implementation complex.

In contrast, the present systems and methods track the fine beams for UEs in a cell based on custom-designed beam patterns, where each transmitted signal is common across all UEs. Furthermore, a particular UE's signal strength measurements are combined across beam patterns to produce a bit vector, and each bit vector is associated with a fine beam. Thus, significantly less than N transmissions (and less than N time resources) can be used to reliably select the fine beam for a given UE. For example, if a cell area was covered by 64 fine beams, the configurations described herein may be able to select a respective fine beam for each UE in the cell by transmitting only 6, 8, or 12 beam patterns across 6, 8, or 12 time resources, respectively. Specifically, in the methods described herein, the number of transmissions for tracking N fine beams, scales as O(log(N)), where "0" refers to the "order of". For example, in the brute force method, the number of required measurements scales proportional to N, whereas in the present systems and methods it scales proportional to log(N) which grows much slower than N. Combining measurements across beam patterns can thus reduce the negative effect of beam tracking on throughput compared to previous approaches.

Furthermore, since no UE-specific reference signals are sent during the beam tracking techniques described herein (the signal is common for all UEs and the measurement configuration is also common for all UEs), the configurations herein are simpler to implement than previous approaches with UE-specific signals.

Example 5G C-RAN

FIG. 1 is a block diagram illustrating one exemplary embodiment of a radio access network (RAN) system 100 in which the techniques described here for beam tracking can be used. The RAN system 100 shown in FIG. 1 implements a base station. The RAN system 100 can also be referred to here as a "base station" or "base station system."

In the exemplary embodiment shown in FIG. 1, the system 100 is implemented at least in part using a centralized or cloud RAN (C-RAN) architecture that employs, for each cell (or sector) 102 served by the system 100, the following logical nodes: at least one control unit (CU) 104, at least one at least one distributed unit (DU) 106, and multiple remote units (RUs) 108. The system 100 is also referred to here as a "C-RAN system" 100. Each RU 108 is remotely located from each CU 104 and DU 106 serving it. Also, in this exemplary embodiment, at least one of the RUs 108 is remotely located from at least one other RU 108 serving that cell 102.

The RAN system 100 can be implemented in accordance with one or more public standards and specifications. In some configurations, the RAN system 100 is implemented using the logical RAN nodes, functional splits, and fronthaul interfaces defined by the O-RAN Alliance. In such an O-RAN example, each CU 104, DU 106, and RU 108 can be implemented as an O-RAN control unit (CU), O-RAN distributed unit (DU), and O-RAN remote unit (RU), respectively, in accordance with the O-RAN specifications. That is, each CU 104 comprises a logical node hosting Packet Data Convergence Protocol (PDCP), Radio Resource Control (RRC), Service Data Adaptation Protocol (SDAP), and other control functions. Each DU 106 comprises a logical node hosting Radio Link Control (RLC), and Media Access Control (MAC) layers as well as the upper or higher portion of the Physical (PHY) layer (where the PHY layer is split between the DU 106 and RU 108). Each RU 108 comprises a logical node hosting the portion of the PHY layer not implemented in the DU 106 (that is, the lower portion of the PHY layer) as well as implementing the basic RF and antenna functions.

Although the CU 104, DU 106, and RUs 108 are described as separate logical entities, one or more of them can be implemented together using shared physical hardware and/or software. For example, in the exemplary embodiment shown in FIG. 1, for each cell 102, the CU 104 and DU 106 serving that cell 102 are physically implemented together using shared hardware and/or software, whereas each RU 108 is physically implemented using separate hardware and/or software.

Also, in the exemplary embodiment described here in connection with FIG. 1, the RAN system 100 is implemented as a Fifth Generation New Radio (5G NR) RAN that supports a 5G NR wireless interface in accordance with the 5G NR specifications and protocols promulgated by the 3rd Generation Partnership Project (3GPP). Thus, in this embodiment, the RAN system 100 can also be referred to as a "Next Generation Node B" 100, "gNodeB" 100, or "gNB" 100.

Each RU 108 includes or is coupled to one or more antennas 110 via which downlink RF signals are radiated to various items of user equipment (UE) and via which uplink RF signals transmitted by UEs 112 are received.

The system 100 is coupled to a core network 114 of the associated wireless network operator over an appropriate backhaul 116 (such as the Internet). Also, each DU 106 is communicatively coupled to the RUs 108 served by it using a fronthaul 118. Each of the DU 106 and RUs 108 include one or more network interfaces (not shown) in order to enable the DU 106 and RUs 108 to communicate over the fronthaul 118.

In one implementation, the fronthaul 118 that communicatively couples the DU 106 to the RUs 108 is implemented using a switched ETHERNET network 121. In such an implementation, each DU 106 and RUs 108 includes one or more ETHERNET interfaces for communicating over the switched ETHERNET network 121 used for the fronthaul 118. However, it is to be understood that the fronthaul between each DU 106 and the RUs 108 served by it can be implemented in other ways.

Each CU 104, DU 106, and RU 108 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 104, DU 106, RU 108, and the system 100 more generally, can be implemented in other ways.

Other embodiments can be implemented in other ways.

As noted above, in the exemplary embodiment described here in connection with FIG. 1, the RAN system 100 is implemented as a 5G NR RAN that supports a 5G NR wireless interface to wirelessly communicate with the UEs 112.

More specifically, in the exemplary embodiment described here in connection with FIG. 1, the 5G NR wireless interface supports the use of beamforming for wirelessly communicating with the UEs 112 in both the downlink and uplink directions using the millimeter wave (mmWave) radio frequency (RF) range defined for 5G NR (Frequency Range 2 or "FR2"). 5G NR RAN systems typically make use of fine beams and beamforming, especially when FR2 is used. We assume beam-reciprocity herein, where the best transmit beam for a UE 112 at a given time will also be the best receive beam for the UE 112, at that time, and vice-versa. Hence, by determining a transmit fine beam for a UE 112 at a particular time, we also determine a receive fine beam for the UE 112 at the particular time.

To perform such beamforming, each RU 108 comprises an array of multiple, spatially separated antennas 110. When FR2 is used, the spacing of the antennas 110 in the array is on the order of several millimeters (as opposed to several centimeters as is the case when FR1 is used) and can be implemented in a convenient fashion.

Each fine beam concentrates energy in a single narrow direction, thus providing better signal quality for a UE 112 that is within that fine beam. In the downlink direction (that is, when the gNB 100 transmits to the UE 112), the directionality of the array is controlled by adjusting the phase and relative amplitude of the signal transmitted from each antenna 110 in order to create a pattern of constructive and destructive interference in the wavefront. In the uplink direction (that is, when the gNB 100 receives transmissions from the UE 112), the directionality of the array is likewise controlled by adjusting the phase and relative amplitude of the signal received via each antenna 110 in order to create a pattern of constructive and destructive interference in the resulting combined signal (which results from combining the signals received via all of the antennas 110 in the array). That is, for both downlink and uplink, each fine beam has an associated direction.

Beamforming can be done in an analog manner (for example, by applying the phase and relative amplitude weights in the RF front-end circuitry in each RU 108), in a digital manner (for example, by applying the phase and relative amplitude weights to the frequency domain data generated for each antenna 110 for that UE 112 as a part of the lower PHY layer processing performed in each RU 108), or a combination of analog and digital beamforming (also called "hybrid"). The systems and methods may utilize analog beamforming herein, although other configurations can be implemented in other ways.

Although the following examples are described as being implemented using FR2, it is to be understood that other frequency ranges can also theoretically be used (for example, the sub 6 Gigahertz (GHz) frequency range defined for 5G NR (Frequency Range 1 or "FR1")).

Figure 2:
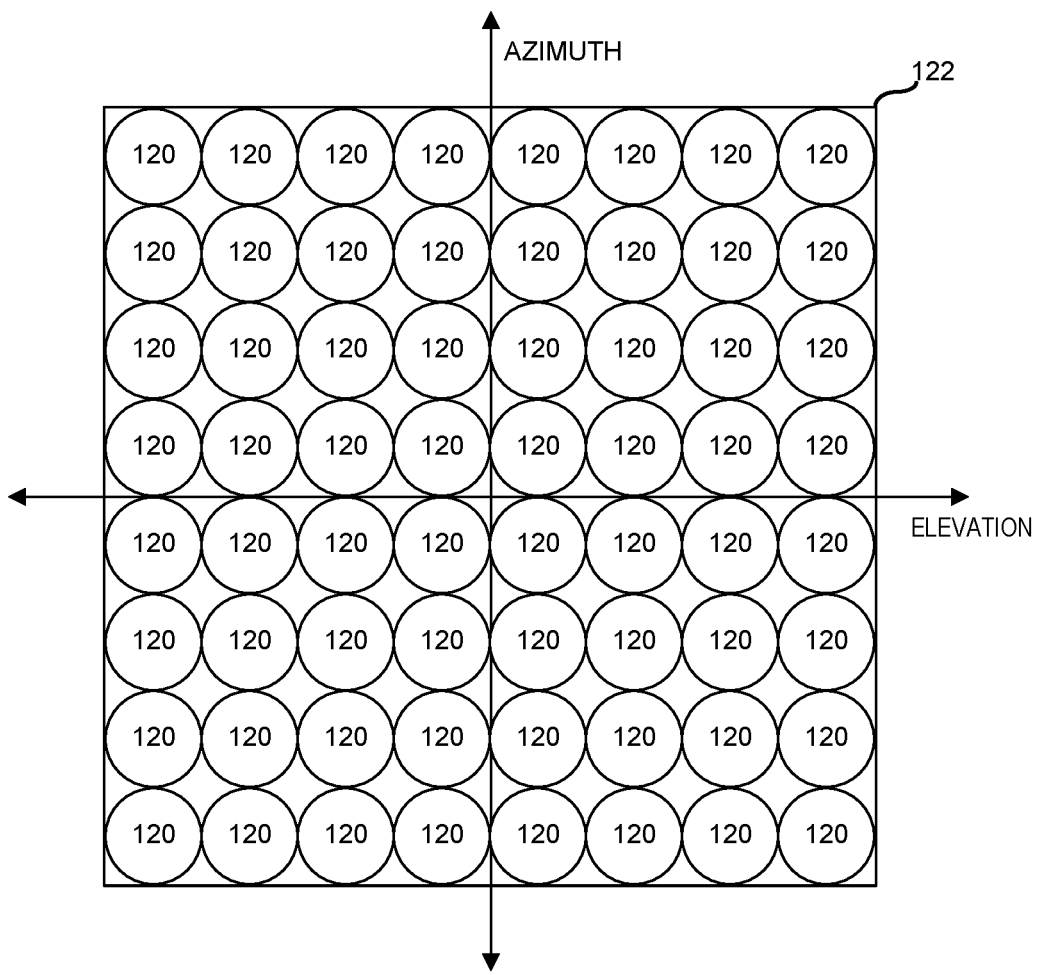
FIG. 2 is a block diagram illustrating fine beams covering a cell area.

FIG. 2 is a block diagram illustrating fine beams 120 covering a cell area 122. Each circle in FIG. 2 is a fine beam 120 in the cell area 122, which is represented by the square. The gNB 100 is configured to communicate with the various UEs 112 it serves by using a predetermined number of fine beams 120. While 64 fine beams 120 are illustrated in the examples of FIG. 2, a gNB 100 may implement any number (N) of fine beams 120. Each fine beam 120 has a set of "neighbor" beams 120 that are oriented in the directions that are closest to the direction of that given fine beam.

Each fine beam 120 may be directed at a respective azimuth and elevation (e.g., to transmit from a RU 108) and, therefore, be directed to (cover) a sub-area within a cell area 122. Generally, neighboring sub-areas (covered by neighboring fine beams 120) may overlap at their edges, and every (or almost every) location in the cell area 122 falls within at least one of the sub-areas. In other words, every (or almost every) location within the cell area 122 is covered by at least one fine beam 120.

A particular combination of fine beams 120 may be referred to as a "beam pattern" (or just "pattern"). For example, when a gNB 100 is configured with 64 available fine beams 120, a first beam pattern may allocate some of the 64 fine beams 120 to be active (e.g., used to receive or transmit signals) and others of the 64 fine beams 120 to be inactive (e.g., not used to receive or transmit signals), while a second beam pattern may active/inactive allocation for the 64 fine beams 120 than the first beam pattern. Additionally, a beam pattern may allocate all available fine beams 120 as active or all available fine beams 120 as inactive. For example, a gNB 100 with 64 available fine beams 120 may have $2^{64}$ available beam patterns.

In order to determine which fine beam 120 to use to communicate with a particular UE 112, the gNB 100 is configured to perform a fine beam 120 selection process. The particular fine beam 120 used to communicate with a particular UE 112 is also referred to here as the "serving" fine beam 120 for that UE 112.

The gNB 100 periodically (e.g., with a periodicity between 20 and 160 ms) transmits sets of Synchronization Signal Blocks (SSBs) in bursts (e.g., 5 ms bursts). Each SSB burst set includes up to 64 individual SSBs, which are usually transmitted in distinct time resources.

After a fine beam 120 is selected for a UE 112, the gNB 100 transmits data to (in the downlink) and receives data from (in the uplink) the UE 112 only using the fine beam 120 determined for that UE 112 (e.g., until a new fine beam 120 is selected for the UE 112 or the UE 112 disconnects from the cell 102, and with the exception of broadcast communication to more than one UE 112). This fine beam 120 determination may be performed periodically to determine which fine beam 120 the gNB 100 should use to communicate with that UE 112 given the UE's current location.

As noted above, the gNB 100 shown in FIG. 1 includes multiple RUs 108. The gNB 100 may use a transmit/receive antenna array that can transmit and receive using N fine beams 120, where N could be any suitable positive integer, e.g., 64. In some examples, each of the N fine beams 120 in a beam pattern originates at the same RU 108 of the gNB 100, in which case all N fine beams 120 would originate from the RU's antenna array. In other examples, different fine beams 120 in a beam pattern originate at antenna arrays of different RUs 108 of the gNB 100. In some configurations, each RU 108 is capable of performing beamforming independently of the other RUs 108 (using analog and/or digital beamforming), e.g., for each time resource, each RU 108 may be able to use a different fine beam 120.

The gNB 100 may continuously determine/select which fine beam 120 to use when communicating with each UE 112 due to UE mobility, which is referred to as "beam tracking" herein. This tracking can be done using the CSI-RS measurement framework, where known reference signals (e.g., CSI-RSs and/or SSBs) are broadcast using different fine beams 120 by the gNB, and measurements are configured on the UEs 112.

During initial attachment, the gNB 100 transmits sets of SSBs (e.g., in 5 ms bursts), with a periodicity (e.g., between 20-160 ms). Each SSB burst set may include N (e.g., 64) individual SSBs that are usually transmitted in distinct time resources. In some configurations, each of these SSBs are transmitted using a different downlink fine beam 120, such that the full SSB set "sweeps" across the coverage area 122 of the cell 102. Each of these SSB transmissions is associated with a RACH time/frequency occasion and/or RACH preamble, with association being known to UEs 112 via the RACH configuration information of the gNB 100. The UE 112 can measure each of these SSBs, and then perform RACH procedure on the RACH resource corresponding to the fine beam 120 received with the strongest signal strength), hereby informing the gNB 100 of a transmit/receive fine beam 120 for the UE 112, for use from then onwards. In other words, during initial attachment, a UE 112 may indicate its preferred SSB indirectly by selecting a Random Access Channel (RACH) preamble/resource that is mapped to the SSB of interest. After initial attachment, the gNB 100 may continue to track/select the respective fine beam 120 for each UE 112, e.g., until the UE 112 detaches/disconnects from the cell (due to radio link failure, physically moving away from the gNB 100, or any other reason).

A simple "brute-force" solution to the beam tracking problem would be to use the entire set of all available (N) fine beams 120 to sweep the coverage area 122 or the cell 102 (with CSI-RS and/or SSB) and then using the fine beams 120 associated with the strongest measurements for a UE 112. In general, this set (N) of available fine beams 120 can be large in some antenna arrays. When analog beamforming is used, all the PRBs of a given symbol can only be transmitted and/or received using a single fine beam 120. Therefore, as more fine beams 120 are used for tracking, more beams are forcibly assigned for the symbols, independent of the actual UE 112 demand. This can lead to significant loss in throughput. So, it would be advantageous to keep this set as small as possible.

Furthermore, previous beam-tracking/refinement techniques may require a CSI-RS to be assigned and transmitted on a per-UE basis, using the set of fine beams 120 within which the UE 112 is tracked. This can increase the implementation complexity and load, and create many scheduling constraints. From this perspective, it will be beneficial to have a sweeping set of signals that is not UE-specific, and can be used across all UEs 112 simultaneously.

Unlike previous beam-sweeping solutions, the present systems and methods: (1) transmit on a few (e.g., 6-8) beam patterns, and combine the information across all the beam patterns to select the specific fine beam 120 for the UE 112; and (2) use a common signal for all UEs 112 and a common measurement configuration for all UEs 112, e.g., there's no transmissions that are unique to a particular UE 112 (or subset of UEs 112) in the cell 102. By combining information obtained from transmissions using different beam patterns, fewer total measurements are needed (and less symbols monopolized) during beam tracking. Using a common signal (and measurement configuration) across all UEs is simpler and more efficient than UE-specific solutions.

Figure 3:
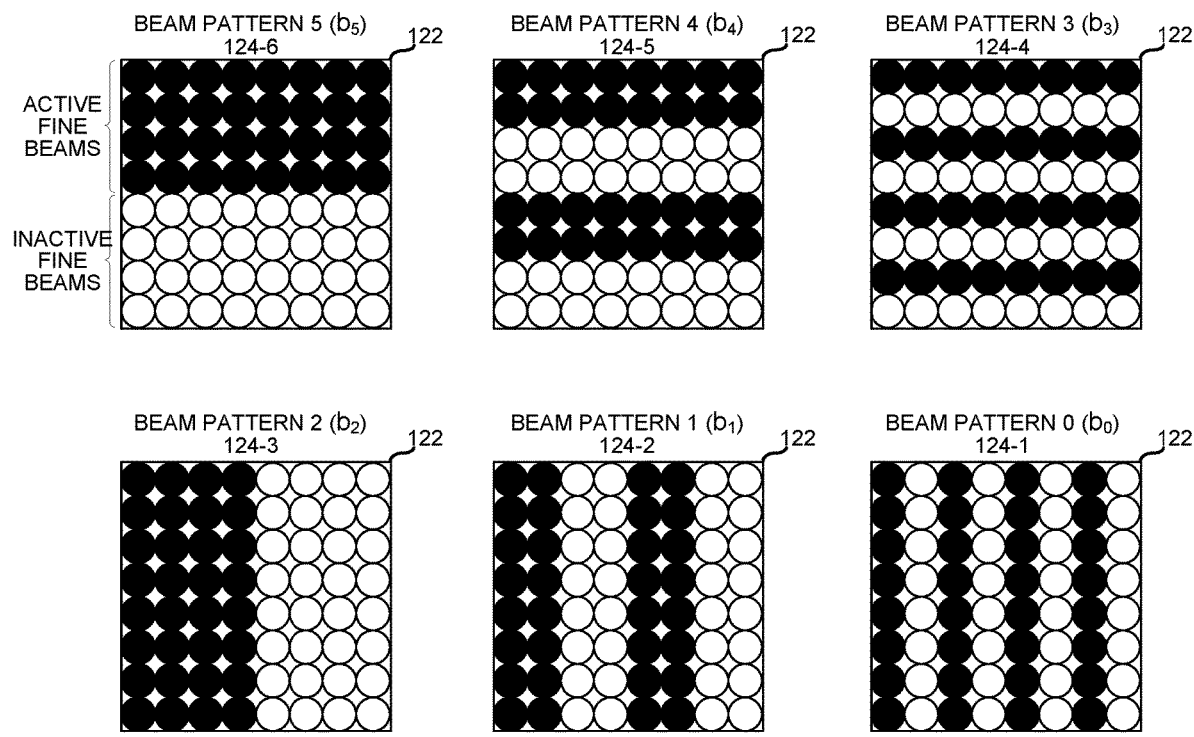
FIG. 3 is a block diagram illustrating a first example set of beam patterns.

FIG. 3 is a block diagram illustrating a first example set of beam patterns 124-1 through 124-6. Specifically, each of beam patterns 0-5 ($b_0$-$b_5$) 124 include N (e.g., 64) fine beams 120 covering the cell area 122, where black-filled circles in FIG. 3 are active fine beams 120 (e.g., used to transmit a signal) in the beam pattern 124, and white-unfilled in FIG. 3 circles are inactive fine beams 120 (e.g., not used transmit a signal) in the beam pattern 124. During beam tracking, the gNB 100 (e.g., RU(s) 108) may transmit signal(s) on each beam pattern 124 in respective time resources.

Each of the beam patterns 124 in FIG. 3 cover half the coverage area 122 of the square cell 102. Further, the overlap between any two beam-patterns 124 in FIG. 3 is also 50%. Due to this, based on whether the UE 112 can "see" the beam pattern 124 (e.g., whether the measured signal strength of the signal transmitted using the beam pattern 124 is above/below a threshold), each of these patterns 124 can provide one bit of information as to which fine beam 120 to select for the UE 112. In all, six bits of information are collected by transmitting on each of the six beam patterns 124 (at different times). When combined, these six bits of information for the UE 112 narrow the fine beam 120 (to select for the UE 112) to one of $2^6$ (64) fine beams 120.

Specifically, each of the beam patterns 124 may be assigned a value 0 or 1, based on the measured signal strength (e.g., a Signal-to-Interference-plus-Noise Ratio (SINR)) at a UE 112 being above or below a threshold. For each set of measurements, which are reported from the UE 112 to the gNB 100, a 6-bit bit vector ($b_5 b_4 b_3 b_2 b_1 b_0$) can be determined, which can be uniquely mapped to one of the 64 fine beams 120. The beam pattern 124 to bit position mapping is given in the Table 1:

TABLE 1

| Beam Pattern | Bit Position |
| --- | --- |
| 5 | $b_5$ |
| 4 | $b_4$ |
| 3 | $b_3$ |
| 2 | $b_2$ |
| 1 | $b_1$ |
| 0 | $b_0$ |

Figure 4:
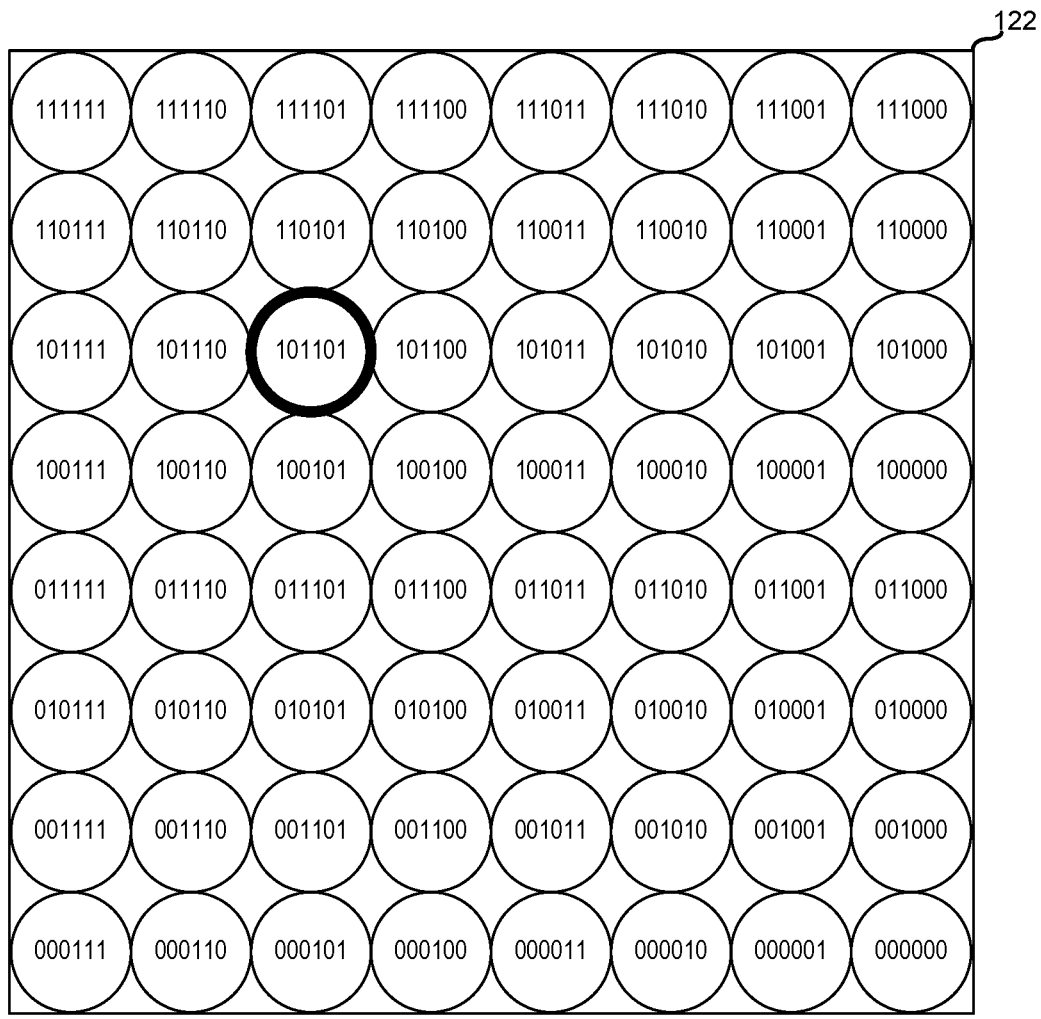
FIG. 4 is a block diagram illustrating bit vectors for each fine beam in a cell area using the second example set of beam patterns in FIG. 3.

FIG. 4 is a block diagram illustrating bit vectors for each fine beam 120 in a cell area 122 using the first example set of beam patterns 124 in FIG. 3. In FIG. 4, a particular UE 112 at the location/sub-area corresponding to the highlighted fine beam 120 (bolded circle in the third column, third row) would see high signal strengths only for signals transmitted using beam patterns 5, 3, 2 and 0, as can be verified from the beam patterns 124 in FIG. 3. Thus, measurements from a UE 112 at this location/sub-area (reported back to the gNB 100) would enable the gNB 100 to determine a bit vector of 101101, where a "1" is assigned for a beam pattern 124 when the UE 112 receives the signal using a beam pattern 124 at a sufficiently high signal strength (e.g., an SINK greater than or equal to a threshold), and a "0" is assigned for the beam pattern 124 when the UE 112 does not receive the signal using the beam pattern 124 at a sufficiently high signal strength (e.g., an SINR less than the threshold). Using the 101101 bit vector, the gNB 100 (e.g., CU 104, DU 106, or RU 108) can select the highlighted fine beam 120 for the UE 112. Similarly, each location/sub-area within the larger cell area 122 would produce a corresponding, unique bit vector shown in FIG. 4.

Thus, this technique can be used to track N fine beams using only $\log_2(N)$ tracking beam patterns 124. Note that the set of beam patterns shown in FIG. 3 does not cover the entire cell 102 uniformly. Specifically, a UE 112 at the location/sub-area associated with the 000000 bit vector (lower, right corner of the cell area 122) would not receive signals transmitted on any of the beam patterns 124 in FIG. 3 at a sufficiently-high signal strength, while a UE 112 at the location/sub-area associated with the 111111 bit vector (upper, left corner) would receive signals transmitted on all of the beam patterns 124 in FIG. 3 at a sufficiently-high signal strength. Hence, the set of beam patterns 124 in FIG. 3 may not be ideal for use in beam tracking because the signal would not reach every location/sub-area in the cell area 122. Furthermore, the set of beam patterns 124 in FIG. 3 may only work if a UE 112 sees a single fine beam 120 (at a sufficiently high signal strength) and if there are no errors in the measured bit vector for the UE 112.

Figure 5:
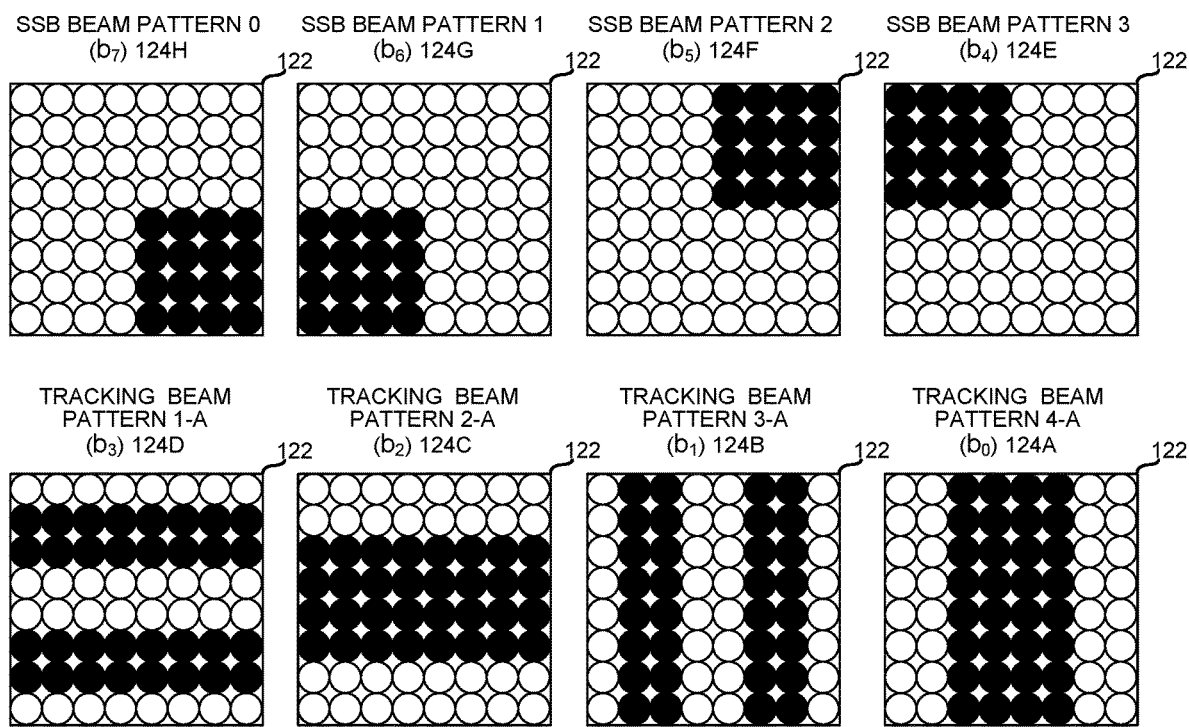
FIG. 5 is a block diagram illustrating a second example set of beam patterns.

FIG. 5 is a block diagram illustrating a second example set of beam patterns 124A-H. Specifically, each of the beam patterns 124 in FIG. 5 include N fine beams 120 covering the cell area 122, where N could be any suitable positive integer, e.g., 16, 64, 256, etc. For N=64 fine beams 120, the number of measurements and hence the number of bits is ($b_0 \ldots b_f(N)$), where f(64)=6, 8 (in FIG. 5), 12, etc. For larger or smaller N, more or fewer beam patterns 124 (and, therefore bits) will be used, e.g., the size of N may affect f(N). For example, beam tracking methods described herein could be scaled to a larger or lower N (greater than or less than 64). In one example, the method could be scaled for a larger N by replicating the beam-patterns 124A-H K times to track K×N fine-beams, and add the K beam patterns 124 to the beam patterns 124A-H in FIG. 5, each pattern 124 containing a different set fine beams 120 set to active. Any suitable scaling method can be used, while following the general method described herein of getting different bits of information, relating to the UE's location, from a UE's different measurements, then combining them to select a fine beam 120 for the UE 112.

As before, black-filled circles in FIG. 5 are active fine beams 120 (e.g., used to transmit a signal) in the beam pattern 124, and white-unfilled circles in FIG. 5 are inactive fine beams 120 (e.g., not used transmit a signal) in the beam pattern 124.

During beam tracking, the gNB 100 (e.g., RU(s) 108) may transmit signal(s) on each beam pattern 124 in respective time resources. For example, in respective time resources, the gNB 100 may transmit SSBs using SSB beam pattern 0 ($b_7$) 124H, SSB beam pattern 1 ($b_6$) 124G, SSB beam pattern 2 ($b_5$) 124F, and SSB beam pattern 3 ($b_4$) 124E. Then in additional respective time resources, the gNB 100 may transmit a different signal (e.g., CSI-RSs) using tracking beam pattern 1-A ($b_3$) 124D, tracking beam pattern 2-A ($b_2$) 124C, tracking beam pattern 3-A ($b_1$) 124B, and tracking beam pattern 4-A (IV) 124A (collectively referred to as the "A" tracking beam patterns 124A-D).

While the first example set of beam patterns 124 (in FIG. 3) illustrates a simple example that may be used with the beam tracking technique described herein, the second example set of beam patterns 124 (in FIG. 5) possesses additional properties, such as ease of implementation and better robustness for use with the beam tracking described herein. The second example set of eight beam patterns 124 in FIG. 4 can be used to identify one of N (64) fine beams 120 for the UE 112, where eight is slightly larger than $\log_2(N)$ ($\log_2(64)$=6 in this case).

For each set of measurements, reported from each UE 112 to the gNB 100, an 8-bit vector ($b_7 b_6 b_5 b_4 b_3 b_2 b_1 b_0$) can be determined, which can be uniquely mapped to one of the 64 fine beams 120. The beam pattern 124 to bit position mapping is given in the Table 2:

TABLE 2

| Beam Pattern | Bit Position |
| --- | --- |
| SSB Beam Pattern 0 | $b_7$ |
| SSB Beam Pattern 1 | $b_6$ |
| SSB Beam Pattern 2 | $b_5$ |
| SSB Beam Pattern 3 | $b_4$ |
| Tracking Beam Pattern 1-A | $b_3$ |
| Tracking Beam Pattern 2-A | $b_2$ |
| Tracking Beam Pattern 3-A | $b_1$ |
| Tracking Beam Pattern 4-A | $b_0$ |

The set of SSB beam patterns 124E-H cover the entire cell area 122, so that UEs 112 from any location/sub-area in the cell area 122 will generally receive one of the beam patterns 124 and be able to connect to the cell 102. The four SSB beam patterns 124E-H give two bits of information as to the fine beam 120 location of the UE 112. Put another way, assume a UE 112 is equally likely to be present in a location associated with any of the N fine beam 120 (the UE 112 is anywhere in the cell area 122), then the uncertainty of the UE's location is log 2(N) bits. If a measurement reduces the (remaining) uncertainty by factor of 2 (with/without other measurements), the measurement gives 1 bit of information. This is the case with patterns in FIG. 3. In FIG. 5, the SSB beam patterns 124E-H together reduce the uncertainty by a factor of only 2×2=4, which corresponds to 2 bits of information. It should be noted that the two bits of information may be represented using four bits in a bit vector in some configurations. Measurements on each of the remaining beam patterns 124 in FIG. 5, reduce the uncertainty by a factor of 2, and hence give 1 bit of information each. Together, measurements on beam patterns 124A-H give all the 6 bits of information needed to locate the UE 112 in 1 of 64 fine beams 120.

The bits derived from UE 112 measurements of SSB signals using the SSB beam patterns 124E-H may be thought of as quadrant bits because each bit position corresponds to a quadrant of the cell area 122. Using the SSB beam patterns 124E-H, along with the tracking beam patterns 124A-D, the gNB 100 can use the UE's measurements to determine a bit vector that is associated with one of the N fine beams 120.

Figure 6A:
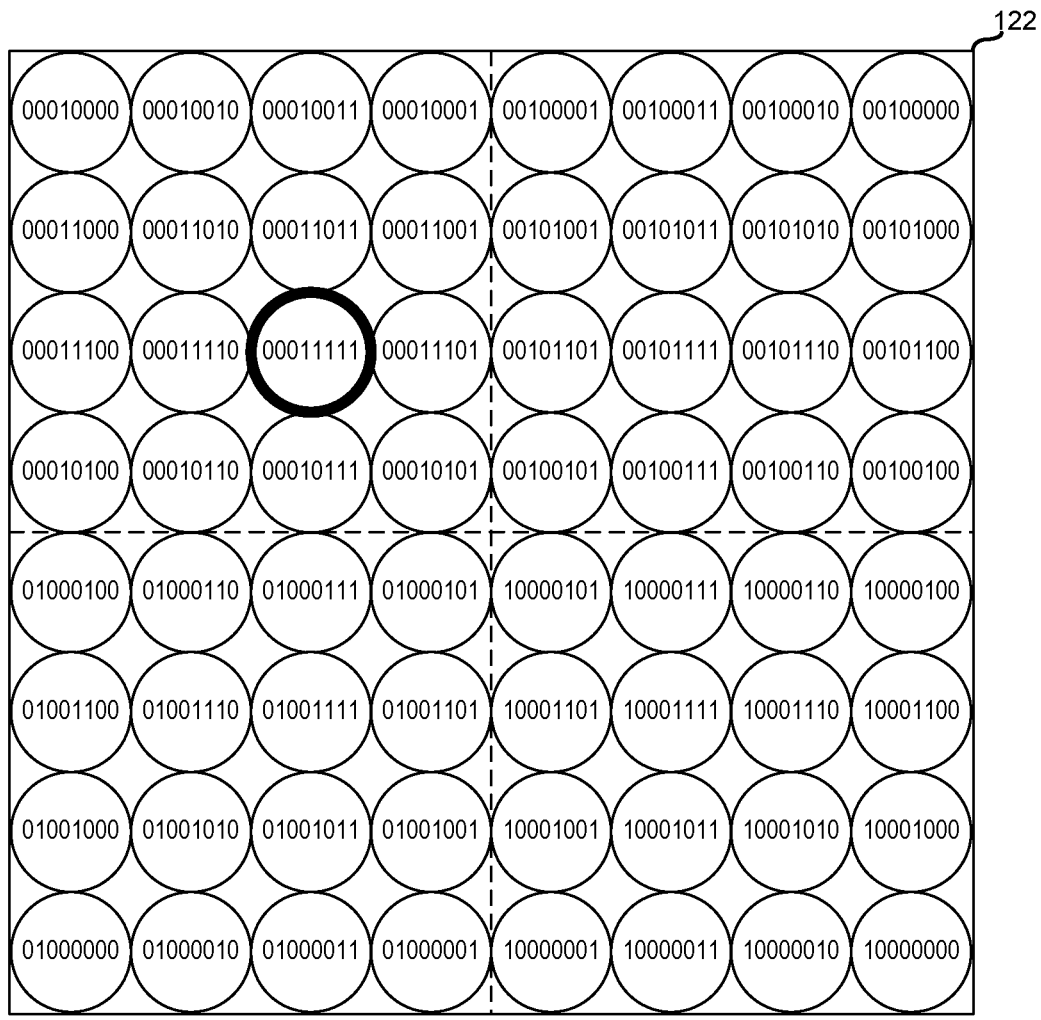
FIG. 6A is a block diagram illustrating bit vectors for each fine beam in a cell area using the second example set of beam patterns in FIG. 5.

FIG. 6A is a block diagram illustrating bit vectors for each fine beam 120 in a cell area 122 using the second example set of beam patterns 124 in FIG. 5. In other words, the 8-bit vector shown in each fine beam 120 of FIG. 6A could be derived (by the gNB 100) using measurements from a UE 112, in the location/sub-area covered by the respective fine beam 120, during beam tracking.

For example, in FIG. 6A, a UE 112 at the location/sub-area corresponding to the highlighted fine beam 120 would see "good" signal strengths (e.g., SINR greater than or equal to a threshold) only in SSB beam pattern 3 124E, and all the tracking beam patterns 124A-D. This corresponds to a bit vector 00011111, which maps to the highlighted fine beam 120.

In general, the above tracking scheme assumes that a UE 112 only sees a signal on one fine beam 120 (above a certain signal strength) at any point in time. However, this may not be true for all UEs 112, e.g., UEs 112 that are in the locations/sub-areas "between" the fine beams 120 (where multiple fine beams 120 overlap) may see a signal in more than one fine beam 120. These UEs 112 may see more than one fine beam 120 at nearly the same signal strength. Other cases where a UE 112 might see multiple fine beams 120 include reflected fine beams 120, and imperfections in beam pattern 124 design.

Figure 6B:
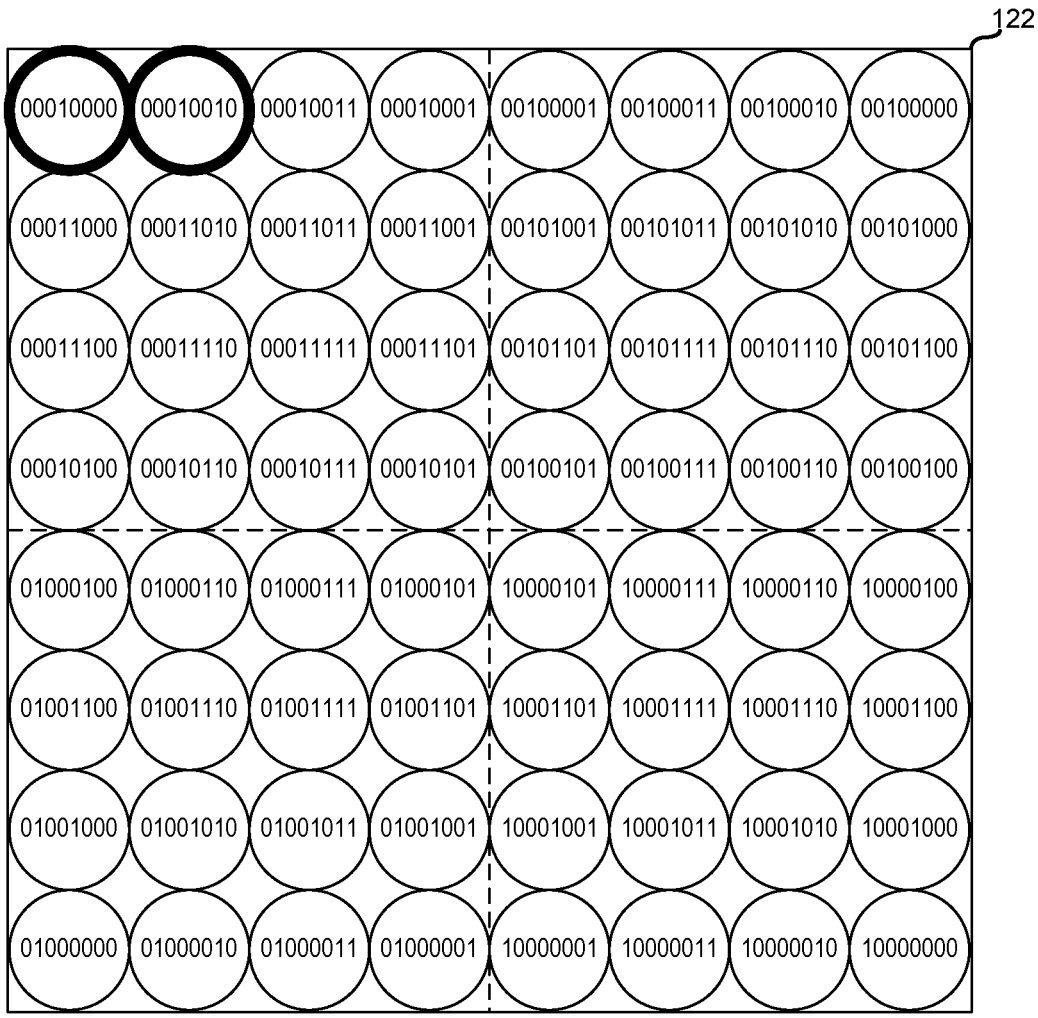
FIG. 6B is a block diagram illustrating an example where a UE is located in an overlap between locations for two neighboring fine beams, where the locations are in the same quadrant of a cell area.

FIG. 6B is a block diagram illustrating an example where a UE 112 is located in an overlap between locations for two neighboring fine beams 120, where the locations are in the same quadrant of a cell area 122 (using the second example set of beam patterns 124 in FIG. 5). Each bit in a particular 8-bit vector (shown in a particular fine beam 120 of FIG. 6B) corresponds to a respective beam pattern 124 in FIG. 5, where a "1" indicates that the respective beam pattern actively transmits to the location/sub-area covered by the respective fine beam 120.

To address this multiple fine beam 120 issue, the second example set of beam patterns (in FIG. 5) has the property that the bitwise OR of the bit vectors of any set of 2 or 4 neighboring (doesn't work for non-neighboring) fine beams 120 (within a quadrant of the cell area 122) is also a bit vector of a fine beam 120 from the same set of 2 or 4 neighboring fine beams 120. Due to this property, when such multiple neighboring fine beams 120 are visible at the UE 112, the measurements are still mapped to one of the fine beams 120 of the multiple neighboring fine beams 120. This property leads to almost zero loss due to beam-tracking error, even in regions where multiple neighboring beams are visible. For example, if a UE 112 were located where the highlighted first two fine beams (having bit vectors of 00010000 and 00010010, respectively) in FIG. 6B overlap, the bitwise OR of their bit vectors would be 00010010, so the gNB 100 would map the UE's 112 measurements to the second fine beam 120 of the two. Therefore, unlike the beam patterns 124 in FIG. 3, the beam patterns 124 in FIG. 5 can be used to select fine beams 120 for a UE 112 even if the UE 112 sees multiple fine beams 120 at once.

Figure 6C:
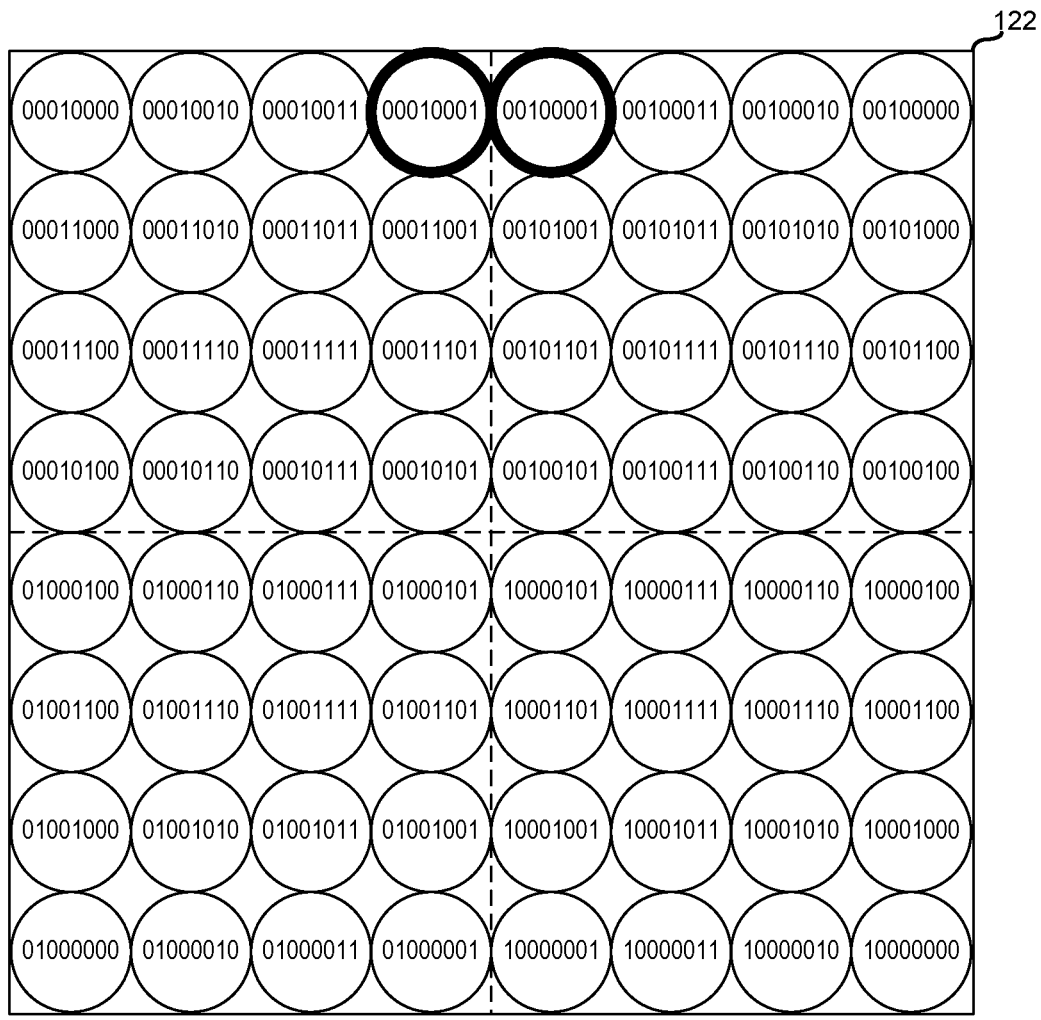
FIG. 6C is a block diagram illustrating an example where a UE is located in an overlap between locations for two neighboring fine beams, where the locations are in different quadrants of a cell area.

FIG. 6C is a block diagram illustrating an example where a UE 112 is located in an overlap between locations for two neighboring fine beams 120, where the locations are in different quadrants of a cell area 122 (using the second example set of beam patterns in FIG. 5). Each bit in a particular 8-bit vector (shown in a particular fine beam 120 of FIG. 6C) corresponds to a respective beam pattern 124 in FIG. 5, where a "1" indicates that the respective beam pattern actively transmits to the location/sub-area covered by the respective fine beam 120.

For the second example set of beam patterns (in FIG. 5), the last 4 bits of the bit vectors for any 2 or 4 neighboring fine beams 120 across quadrant borders (shown in dashed lines in FIGS. 6A-C) are identical. Accordingly, such fine beams 120 (neighboring fine beams 120 across quadrant borders) can be detected simultaneously, e.g., when more than one 'quadrant' bit (the first four bits) will be 1 in the bit vector. For example, the highlighted fourth and fifth fine beams 120 in the first row of FIG. 6C have bit vectors of 00010001 and 00100001, respectively. If a UE 112 were located between these two fine beams 120, the bitwise OR of their bit vectors would be 00110001, the first four bits of which indicate that the UE 112 is in between the top left and top right quadrants of the cell area 122 (in addition to identifying the fine beams 120).

It should be noted that the description herein assumes line-of-sight (LoS) communication, and that any reflected beams are weak in strength compared to LoS beams, and hence can be ignored (with the proper thresholding applied).

Figure 7:
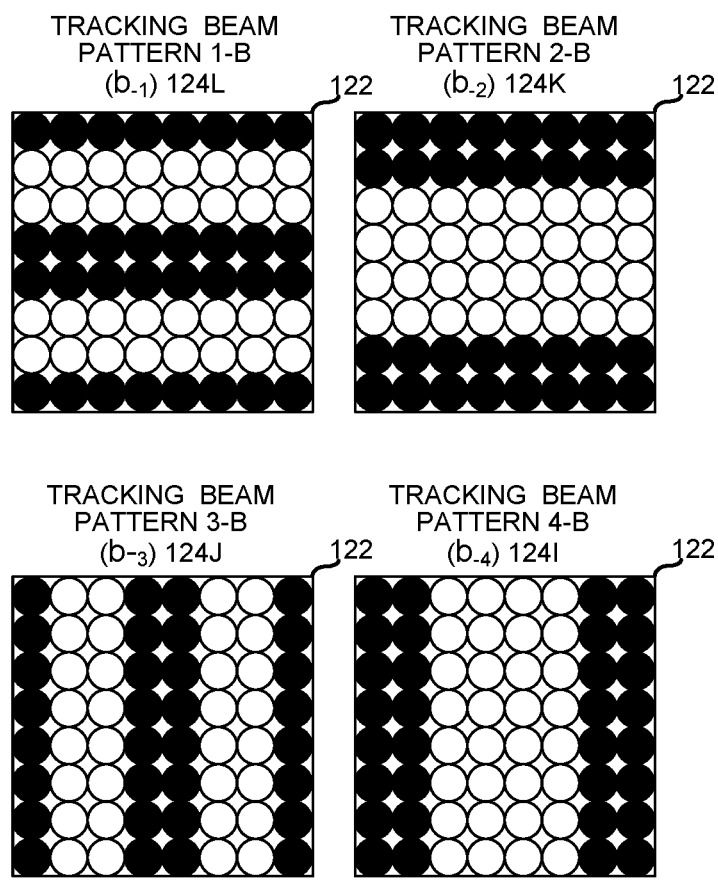
FIG. 7 is a block diagram illustrating a third example set of beam patterns.

FIG. 7 is a block diagram illustrating a third example set of beam patterns 124I-L. Each of beam patterns 124I-L in the third example set include N fine beams 120 covering the cell area 122, where N could be any suitable positive integer, e.g., 16, 64, 256, etc. The third example set of beam patterns 124I-L (also referred to as the "A" tracking beam patterns 124I-L) in FIG. 7 may be complementary to the "A" tracking beam patterns 124A-D in FIG. 5, and may be used with the second example set of beam patterns 124A-H in FIG. 5. For example, the bits determined from measurements of signals transmitted using the "B" tracking beam patterns 124I-L in FIG. 7 would be the complement (bitwise NOT) of bits determined from measurements of signals transmitted using the "A" tracking beam patterns 124A-D in FIG. 5. As before, black-filled circles in FIG. 7 are active fine beams 120 (e.g., used to transmit a signal) in the beam pattern 124, and white-unfilled circles in FIG. 7 are inactive fine beams 120 (e.g., not used transmit a signal) in the beam pattern 124.

For each set of measurements, reported from each UE 112 to the gNB 100, a 12-bit vector $(b_7 b_6 b_5 b_4 b_3 b_2 b_1 b_0 \text{-} b_{-1} b_{-2} b_{-3} b_{-4})$ can be determined, which can be uniquely mapped to one of the 64 fine beams 120. The beam pattern 124 to bit position mapping is given in the Table 3:

TABLE 3

| Beam Pattern | Bit Position |
| --- | --- |
| SSB Beam Pattern 0 | $b_7$ |
| SSB Beam Pattern 1 | $b_6$ |
| SSB Beam Pattern 2 | $b_5$ |
| SSB Beam Pattern 3 | $b_4$ |
| Tracking Beam Pattern 1-A | $b_3$ |
| Tracking Beam Pattern 2-A | $b_2$ |
| Tracking Beam Pattern 3-A | $b_1$ |
| Tracking Beam Pattern 4-A | $b_0$ |
| Tracking Beam Pattern 1-B | $b_{-1}$ |
| Tracking Beam Pattern 2-B | $b_{-2}$ |
| Tracking Beam Pattern 3-B | $b_{-3}$ |
| Tracking Beam Pattern 4-B | $b_{-4}$ |

If all 12 beam patterns 124A-L (in FIGS. 5 and 7) are used, the bit vectors for the beam patterns 124 would take the form of XXXXYYYY-ZZZZ, where Xs are for SSB beam patterns 124E-H, Ys are for the "A" tracking beam patterns 124A-D, and Zs are for the "B" tracking beam patterns 124I-L.

It should be noted that M=log 2(N) may be the bare minimum number of beam patterns 124 to encode N fine beams 120, e.g., as in the example of FIGS. 3-4. However, an M that is greater than log 2(N) may be used in some configurations, such as the combined beam patterns 124A-L in FIGS. 5 and 7, e.g., which allow for the identification of neighbor fine beams 124, as discussed below. Alternatively, (M-log 2(N)) bits can be added to detect and/or correct random errors in the UE's measurements (and bit vector), also discussed below. Accordingly, in different configurations, bit vectors may have different total numbers of bit positions (though there would generally be a 1:1 ratio of bit positions (and therefore UE measurements) to beam patterns 124 used), e.g., different number of X bits, Y bits, and/or Z bits.

During beam tracking, the gNB 100 (e.g., RU(s) 108) may transmit signal(s) on each beam pattern 124 (in the second and third example sets of beam patterns 124) in respective time resources. For example, using the combined second example set of beam patterns 124A-H and third example set of beam patterns 124I-L, a UE 112 at the location/sub-area corresponding to the top left fine beam 120 in the cell area 122 would see "good" signal strengths (e.g., SINR greater than or equal to a threshold) only in SSB beam pattern 3 124E in FIG. 5, and all the "B" tracking beam patterns 124I-L in FIG. 7 (but none of the "A" tracking beam patterns 124A-D in FIG. 5). This corresponds to a bit vector 00010000-1111.

The combined set of SSB beam patterns 124E-H, "A" tracking beams 124A-D, and "B" tracking beams 124I-L (all beam patterns shown in FIGS. 5 and 7) uniformly cover the entire cell are 122 (meaning a UE 112 at any location will see the same number of beam patterns 124 in the combined set). Therefore, in one configuration, the full set of 12 beam patterns 124 in the combined set can be used to transmit SSBs, in which case a UE 112 could use the SSB transmitted on any of the beam patterns 124 (in the combined set) to attach to the cell 102. This would be a simpler implementation than having designated tracking beam patterns 124A-D, I-L used with SSB beam patterns 124E-H.

Alternatively, the four SSB beam patterns 124E-H can be used to transmit SSBs and the tracking beam patterns 124A-H, I-L used to transmit CSI-RSs. The tracking techniques herein (including transmission, measurement, and selection of a fine beam 120 for a UE 112) can be performed (1) periodically, e.g., cycling through the set of beam patterns 124 in an always-ON manner; or (2) aperiodically, based on tracking needs.

When the second example set of beam patterns 124 (SSB beam patterns 124E-H and "A" tracking beams 124A-D in FIG. 5) is used, two neighboring fine beams 120 can be detected simultaneously by a single UE 112 in some cases. For example, two fine beams 120 associated with bit vectors XXXX1001 and XXXX1011 in any of FIGS. 6A-C are neighboring fine beams 120. A UE 112 situated between such fine beams 120 will see the bitwise OR of XXXX1011, which gives one of the fine beams 120. When complementary beams ("B" tracking beams 124I-L in FIG. 7) are also used, the UE's 112 bit vector would be XXXX1011-0110, where the complementary bits (bits following the dash: 0110) indicate that the fine beam 120 associated with bit vector XXXX1001 is also visible at the UE 112 (in addition to the fine beam 120 associated with the bit vector XXXX1011). Therefore, the complement (bitwise NOT) of the complementary bits, when combined (e.g., concatenated to the end of) the first four quadrant bits (XXXX) may indicate the bit vector of another fine beam 120 seen by the UE 112, e.g., the complement of 0110 in the example above is 1001, so the UE 112 also sees the fine beam 120 associated with bit vector XXXX1001. Additionally or alternatively, when the complementary beams ("B" tracking beams 124I-L in FIG. 7) are also used, the complement (bitwise NOT) of the complementary bits (0110 in the example above) would match bits $b_0$-$b_3$ (the YYYY bits) of another fine beam 120 seen by the UE 112, e.g., UE's 112 bit vector would be XXXX1011-0110 would also see the fine beam associated with bit vector XXXX1001.

In some configurations, neighboring fine beam 120 identification is only performed when a first subset of bits in a bit vector (e.g., the YYYY bits) are not complementary of (e.g., the bitwise NOT of) a second subset of bits in the bit vector (e.g., the ZZZZ bits). For example, in some configurations, neighboring fine beam 120 identification is performed only in response to the gNB 100 determining that a first subset of bits in the bit vector (at a first set of bit positions) are not complementary of a second subset of bits in the bit vector (at a second set of bit positions) because this would indicate that multiple fine beams 120 are visible (received with a signal strength equal or greater than a threshold) at the UE 112.

Random errors could be present in individual UE 112 measurements (reported back to the gNB 100), e.g., due to thermal noise, multi-path fading, or various other phenomenon. Averaging over multiple sets of UE 112 measurements can help reduce these errors. If relative signal strengths are measured during the tracking procedure and the multi-path fading is constant across the entire set of measurements (for a UE 112 or multiple UEs 112), these effects (e.g., thermal noise, multi-path fading, etc.) would likely not affect the tracking results. For example, when a given set of measurements is made by a UE 112 (or multiple UEs 112) at the same frequency, approximately the same location, and over a short interval of time (e.g., the second example set of beam patterns 124A-H in FIG. 5 consists of 8 beam patterns 124, requiring 8 SSB transmissions that can be packed into 0.5 to 1 milli-second in some configurations), it may not be necessary to average over multiple sets of measurements made by a UE 112.

Once a fine beam 120 (or a small set of fine beams 120) is selected for a UE 112, further confirmation measurements could optionally take place (e.g., using CSI-RSs) on the specific fine beam(s) 120, e.g., for tracking results that indicate a switch should be made in serving fine beams 120. These would be on-demand measurements, and as such could be less frequent than in the case of a tracking method that uses continuous measurements on all individual fine beams 120.

Figure 8:
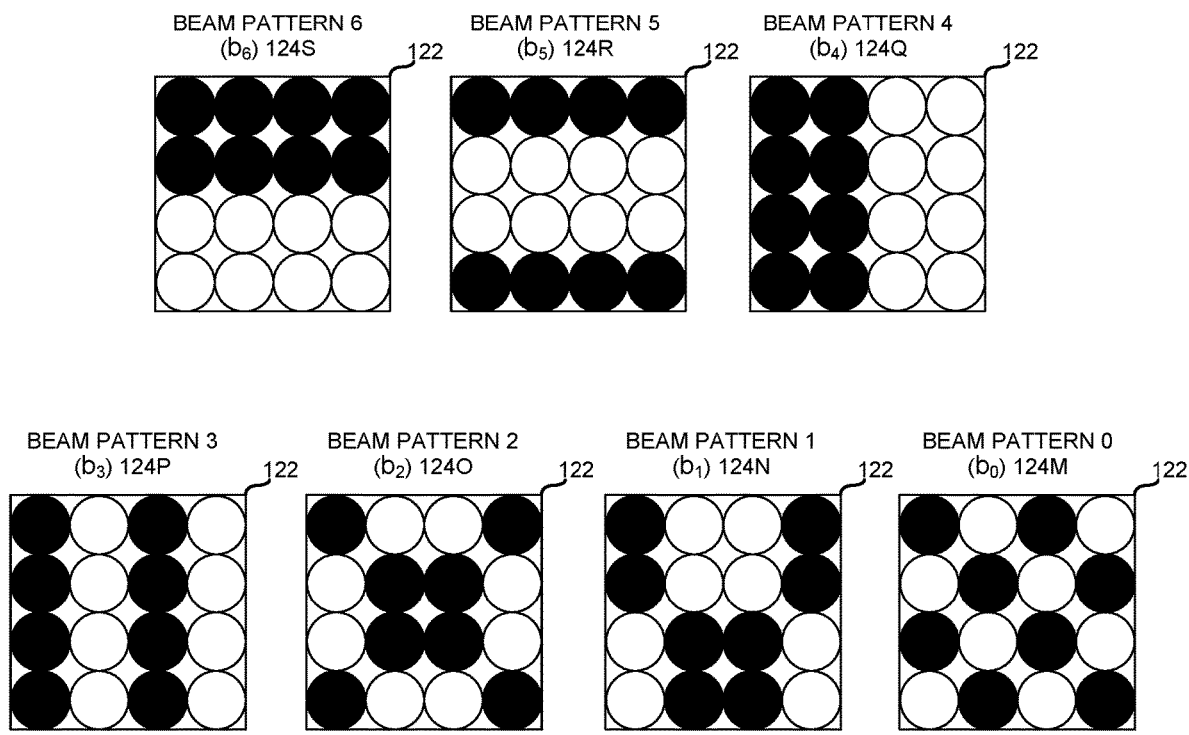
FIG. 8 is a block diagram illustrating a fourth example set of beam patterns, which can be used with error control coding.

FIG. 8 is a block diagram illustrating a fourth example set of beam patterns 124M-S, which can be used with error control coding. Each of beam patterns 124M-S in the fourth example set includes N fine beams 120 covering the cell area 122, where N could be any suitable positive integer, e.g., 16, 64, 256, etc. As before, black-filled circles in FIG. 8 are active fine beams 120 (e.g., used to transmit a signal) in the beam pattern 124, and white-unfilled circles in FIG. 8 are inactive fine beams 120 (e.g., not used transmit a signal) in the beam pattern 124.

The previously-described tracking techniques could be viewed as encoding the fine beams 120 using a binary code. For example, each beam pattern 124 maps to a particular bit position in the bit vector in each of the following configurations described above: (1) using the first example set of beam patterns in FIG. 3 to determine a 6-bit bit vector; (2) using the second set of beam patterns 124A-H in FIG. 5 to determine a 8-bit bit vector; or (3) using the second set of beam patterns 124A-H in FIG. 5 combined with the third set of beam patterns 124I-L in FIG. 7 to determine a 12-bit bit vector. In these tracking techniques, $\log_2(N)$ is the minimum number of bits required to encode N fine beams 120.

However, parity bit(s) may be used in some configurations in order to detect and possibly correct errors. For example, if a 4×4 grid of 16 fine beams 120 used a Hamming (7,4,3) code that codes four bits of information into seven bits and with three bits acting also as parity bits, the binary code would be able to detect 2 bit-errors or correct 1 bit-error. Therefore, each beam pattern 124M-S maps to a bit position in the bit vector/codeword, in the same way as previously described. However, unlike the previous binary code configurations, if random measurement errors cause bit errors in the bit vector, we can correct them and still identify the correct fine beam 120, so long as the number of such bit errors is within the error-correcting capacity of the error-control code used.

Therefore, when error coding is used, each bit position in a bit vector conveys information about whether a respective beam pattern 124 was seen (at a sufficiently high signal strength), and a subset of the bit positions also act as parity bits to detect and/or correct random errors in the measurements. Using the fourth example set of beam patterns 124M-S with a Hamming (7,4,3) code, the 16 bit vectors/codewords would be given by Table 4:

TABLE 4

```
0000000
0001111
0010110
0011001
0100101
0101010
0110011
0111100
1000011
1001100
1010101
1011010
1100110
1101001
1110000
1111111
```

For example, each of bits $b_2b_1b_0$ of each codeword in Table 4 may act as parity bits, in addition to indicating whether the UE 112 saw a respective beam pattern 124 (at a sufficiently high signal strength). Such a configuration would enable the detecting of up to two bit errors in the bit vector or the correction of one bit error in the bit vector.

Figure 9:
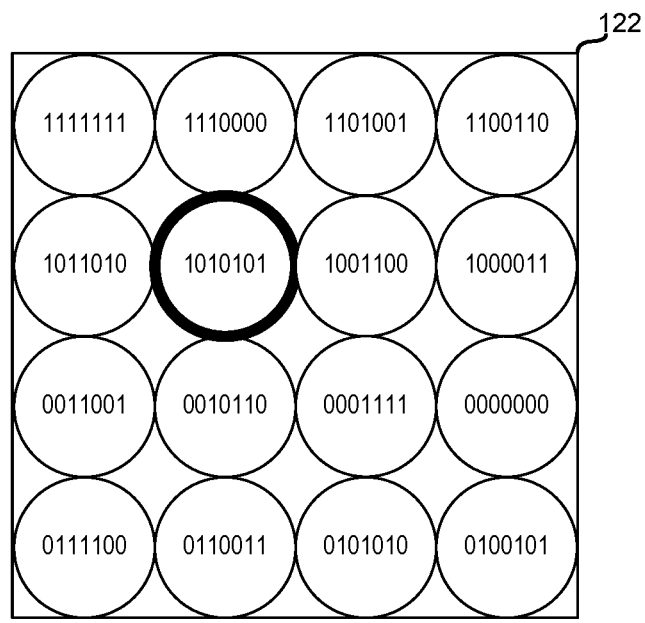
FIG. 9 illustrates the beam pattern to bit vector/codeword mapping for the fourth example set of beam patterns in FIG. 8.

FIG. 9 illustrates the beam pattern to bit vector/codeword mapping for the fourth example set of beam patterns 124M-S in FIG. 8. For each set of 8 measurements, reported from each UE 112 to the gNB 100, a 7-bit vector can be determined, which can be uniquely mapped to one of the 16 fine beams 120 using the mapping in FIG. 9.

Accordingly, the gNB 100 can detect up to 2 errors (or detect and correct one error) in the bit vector obtained from the 7 received measurements from the UE 112, then select a fine beam 120 for the UE 112. Such error(s) in the bit vector can be caused by imperfect beam pattern 124 design or due to intermittent fading effects. For example, the UE 112 may see beam pattern(s) 124 when it shouldn't (or fail to see beam pattern(s) 124 that it should) given its location in a cell area 122, which would result in bit error(s) in the UE's bit vector that could be detected and/or corrected using the parity bits.

For example, if the fine beam 120 associated with bit vector/codeword 1010101 (highlighted in FIG. 9) is detected with 1-bit error as 1110101 (corresponding to error in beam pattern 5 124R). Using a parity-check matrix corresponding to the Hamming code used, the syndrome could be calculated as:

$$\begin{bmatrix} 0 & 0 & 0 & 1 & 1 & 1 & 1 \\ 0 & 1 & 1 & 0 & 0 & 1 & 1 \\ 1 & 0 & 1 & 0 & 1 & 0 & 1 \end{bmatrix} \times \begin{bmatrix} 1 \\ 1 \\ 1 \\ 0 \\ 1 \\ 0 \\ 1 \end{bmatrix} = \begin{bmatrix} 0 \\ 1 \\ 0 \end{bmatrix}$$

which maps to an error in bit $b_5$. In contrast, a binary code for 16 fine beams 120 using only 4 bits (instead of 7 bits) would not be able to detect and/or correct such errors.

The specific error code configuration described herein is merely one possible example, but any suitable error-control code of a suitable length may be used in a similar manner. For example, an 18-bit long bit vector/codeword could be used to encode 64 fine beams 120, and correct up to 3 errors (or) detect up to 8 errors. Furthermore, the beam patterns 124 could be simplified by changing the mapping between the given fine beams 120 and the bit vectors/codewords that represent them.

Figure 10A:
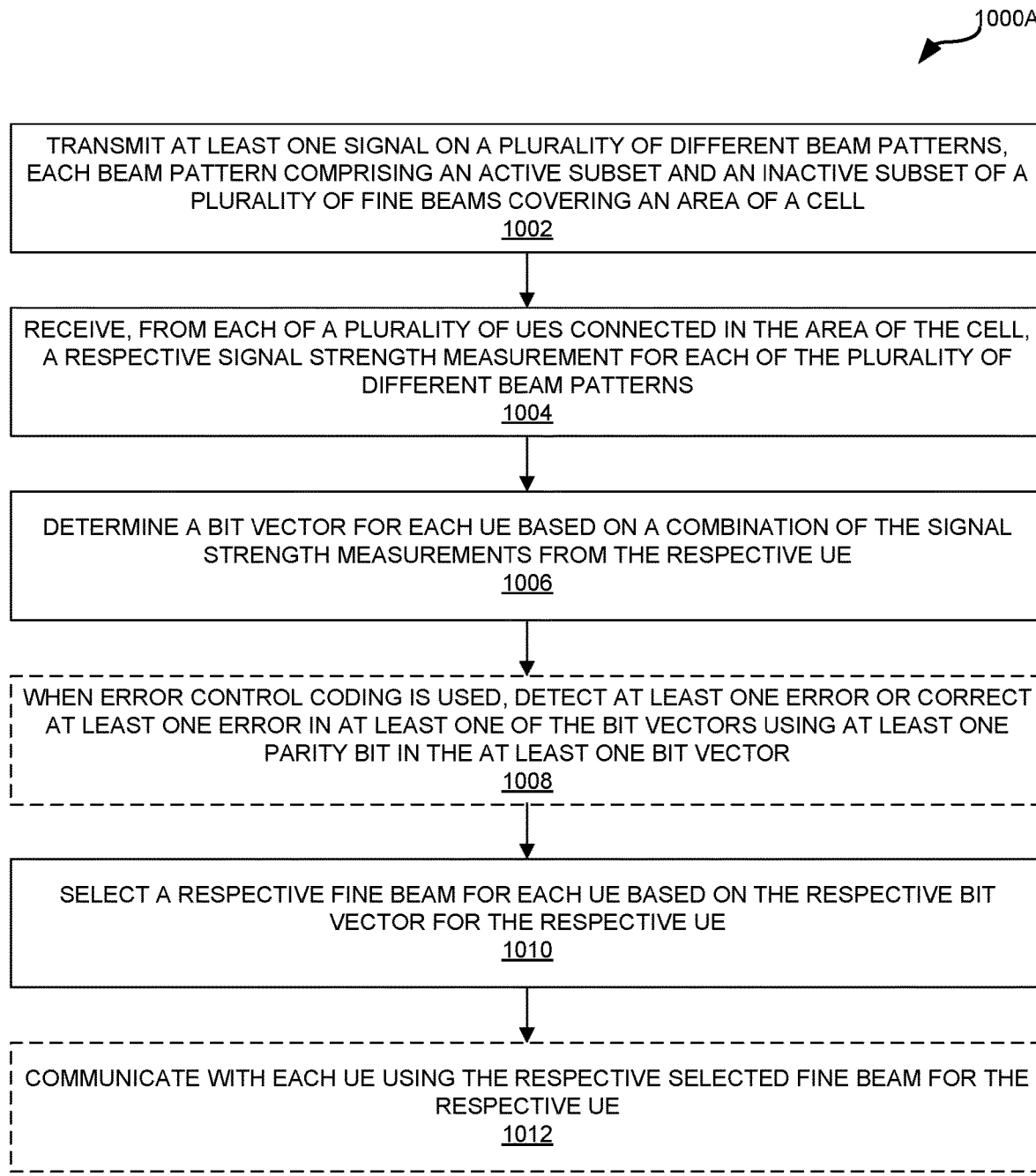
FIG. 10A is a flow diagram illustrating an example method for beam tracking in a base station, e.g., a gNB.

FIG. 10A is a flow diagram illustrating a method 1000A for beam tracking in a base station, e.g., a gNB 100. The method 1000A may be performed, at least in part, by a C-RAN implementing a gNB 100 and using a 5G air interface to communicate with UEs 112 in an area 122 of a cell 102. For example, the method 1000A may be performed by UE(s) 112, CU(s) 104, DU(s) 106, and/or RU(s) 108, e.g., using respective processor(s) executing instructions stored in respective memory. The cell area 122 may be covered by N (e.g., 16, 64, 256, etc.) fine beams 120 transmitted from the gNB 100, e.g., from one or more RUs 108.

The blocks of the flow diagram shown in FIG. 10A have been arranged in a generally sequential manner for ease of explanation; however, it is to be understood that this arrangement is merely exemplary, and it should be recognized that the processing associated with method 1000A (and the blocks shown in FIG. 10A) can occur in a different order (for example, where at least some of the processing associated with the blocks is performed in parallel and/or in an event-driven manner). Also, most standard exception handling is not described for ease of explanation; however, it is to be understood that method 1000A can and typically would include such exception handling.

The method 1000A begins at step 1002 where the gNB 100 transmits at least one signal on a plurality of different beam patterns 124, each beam pattern 124 comprising an active subset and an inactive subset of a plurality of fine beams 120 covering an area 122 of a cell 102. For a given beam pattern 124, the active fine beams 120 may be used to transmit one of the signal(s) during a time resource associated with the beam pattern 124, and the inactive beams 120 are not used to transmit any of the signals during the time resource in some configurations. The N fine beams 120 may originate from a single RU 108 or across multiple RUs 108. In some examples, at least $\log_2(N)$ beam patterns 124 are used to select one of N fine beams 120 that cover an area 122 of a cell 102.

In a first example, at least two different types of signals are transmitted using different beam patterns 124. For example, Synchronization Signal Blocks (SSBs) can be transmitted using the active fine beams 120 in a first subset of the beam patterns 124 (e.g., SSB beam patterns 124E-H) and Channel State Information Reference Signal (CSI-RSs) can be transmitted using the active fine beams 120 in a second subset of the beam patterns 124 (e.g., using the "A" tracking beam patterns 124A-D and, optionally, the "B" tracking beam patterns 124I-L).

In a second example, the same type of signal is transmitted using every beam patterns 124. For example, Synchronization Signal Blocks (SSBs) can be transmitted using the active fine beams 120 in all beam patterns 124.

The method 1000A proceeds at step 1004 where the gNB 100 (e.g., RU(s) 108) receives, from each of a plurality of UEs 112 in the area 122 of the cell 102, a respective signal strength measurement for each of the plurality of different beam patterns 124. For example, each signal strength measurement may be a Signal-to-Interference-plus-Noise Ratio (SINR) for a received signal (transmitted using one of the beam patterns 124), however, any suitable signal strength metric may be used, e.g., received signal strength indicator (RSSI), Signal-to-noise ratio (SNR), etc.

The number of signal strength measurements (and the number (M) of beam patterns 124) may be less than the number (N) of fine beams 120 covering the area 122 of the cell 102. For example, if the area 122 of the cell 102 was covered by 64 fine beams 120 and the second set of beam patterns 124A-H (in FIG. 5) was used, each UE 112 may report 8 signal strength measurements. Alternatively, if the area 122 of the cell 102 was covered by 64 fine beams 120 and the second set of beam patterns 124A-H (in FIG. 5) combined with the third set of beam patterns 124I-L (in FIG. 7) was used, each UE 112 may report 12 signal strength measurements. Alternatively, if the area 122 of the cell 102 was covered by 16 fine beams 120 and the fourth set of beam patterns 124M-S was used, each UE 112 may report 7 signal strength measurements. However, it should be noted that any suitable number of fine beams 120 and beam patterns 124 (and corresponding signal strength measurements) could be used.

The method 1000A proceeds at step 1006 where the gNB 100 (e.g., CU(s) 104 and/or DU(s) 106) determines a bit vector for each UE 112 based on a combination of the signal strength measurements from the respective UE 112. For example, the bit vector for each UE 112 may include a bit for each signal strength measurement.

The gNB 100 may compare each of a UE's signal strength measurements to a threshold to determine the bits in the bit vector for the UE 112. In binary code examples, a "1" may be assigned in a corresponding bit position for signal strength measurements (e.g., an SINR) that are greater than or equal to the threshold, and a "0" may be assigned in a corresponding bit position for signal strength measurements (e.g., an SINR) that are less than the threshold. In some examples, the threshold is based on the maximum value (e.g., maximum signal strength) in the set of UE measurements for one or more (e.g., all) UEs 112, e.g., max{measurements}−3 dB. In some examples, the same threshold is used for every measurement, but other configurations are possible.

In the configurations described herein, the number of beam patterns 124 used (M) is equal to (1) the number of UE measurements taken by each UE 112; and (2) the number of bit positions in each bit vector, e.g., where M>=log 2(N) (log 2(N) is the minimum number of beam patterns 124 to track N fine beams 120). However, other configurations are possible. Therefore, in some configurations, each beam pattern 124 may map to a specific bit position in the bit vectors, e.g., the number of bits allocated to the signal strength measurement, from a particular UE 112, for each of M beam patterns 124 maps to one of M bits in a bit vector for the particular UE 112.

In some configurations, however, (M-log 2(N)) of the bits in the bit vector can also be used to detect and/or correct errors (in addition to indicating whether the UE 112 sees a particular beam pattern 124). Therefore, in error code examples, the M signal strength measurements from a particular UE 112 also map to M bits in the bit vector for the particular UE 112, but with some of the bits also acting as parity bits, e.g., 7 signal strength measurements from a particular UE 112 map to seven bits in the bit vector for the UE 112 with three of the bits also acting as parity bits so that error(s) in the bit vector may be detected and/or corrected. For example, a UE 112 may erroneously see beam pattern(s) 124 at a sufficiently high signal strength when it shouldn't (or erroneously fail to see beam pattern(s) 124 at a sufficiently high signal strength that it should) given its location in a cell area 122, which would result in bit error(s) in the UE's bit vector that could be detected and/or corrected using the parity bits.

The method 1000A proceeds at optional step 1008 where, when error control coding is used, the gNB 100 (e.g., CU(s) 104 and/or DU(s) 106) detects at least one error and/or corrects at least one error in at least one bit vector using at least one parity bit in the at least one bit vector, e.g., as described in conjunction with FIG. 9. If error control coding is not used (or if no errors exist in the bit vector or any other reason), optional step 1008 need not be performed.

The method 1000A proceeds at step 1010 where the gNB 100 (e.g., CU(s) 104 and/or DU(s) 106) selects a respective fine beam 120 for each UE 112 based on the respective bit vector for the respective UE 112. For example, the gNB 100 may use a lookup table or other data structure to select the fine beam 120 for a UE 112 associated with the bit vector for the UE 112. For example, a lookup table may include a list of all the bit vectors, each with an associated fine beam 120 identifier.

The method 1000A proceeds at optional step 1012 where the gNB 100 communicates with each UE 112 using the respective selected fine beam 120 for the respective UE 112. For example, the gNB 100 may transmit data to (in the downlink) and receives data from (in the uplink) the UE 112 only using the fine beam 120 determined for that UE 112 until a new fine beam 120 is selected for the UE 112 or the UE 112 disconnects from the cell 102 (and excluding broadcast signals to more than one UE 112 connected to the cell 102).

Figure 10B:
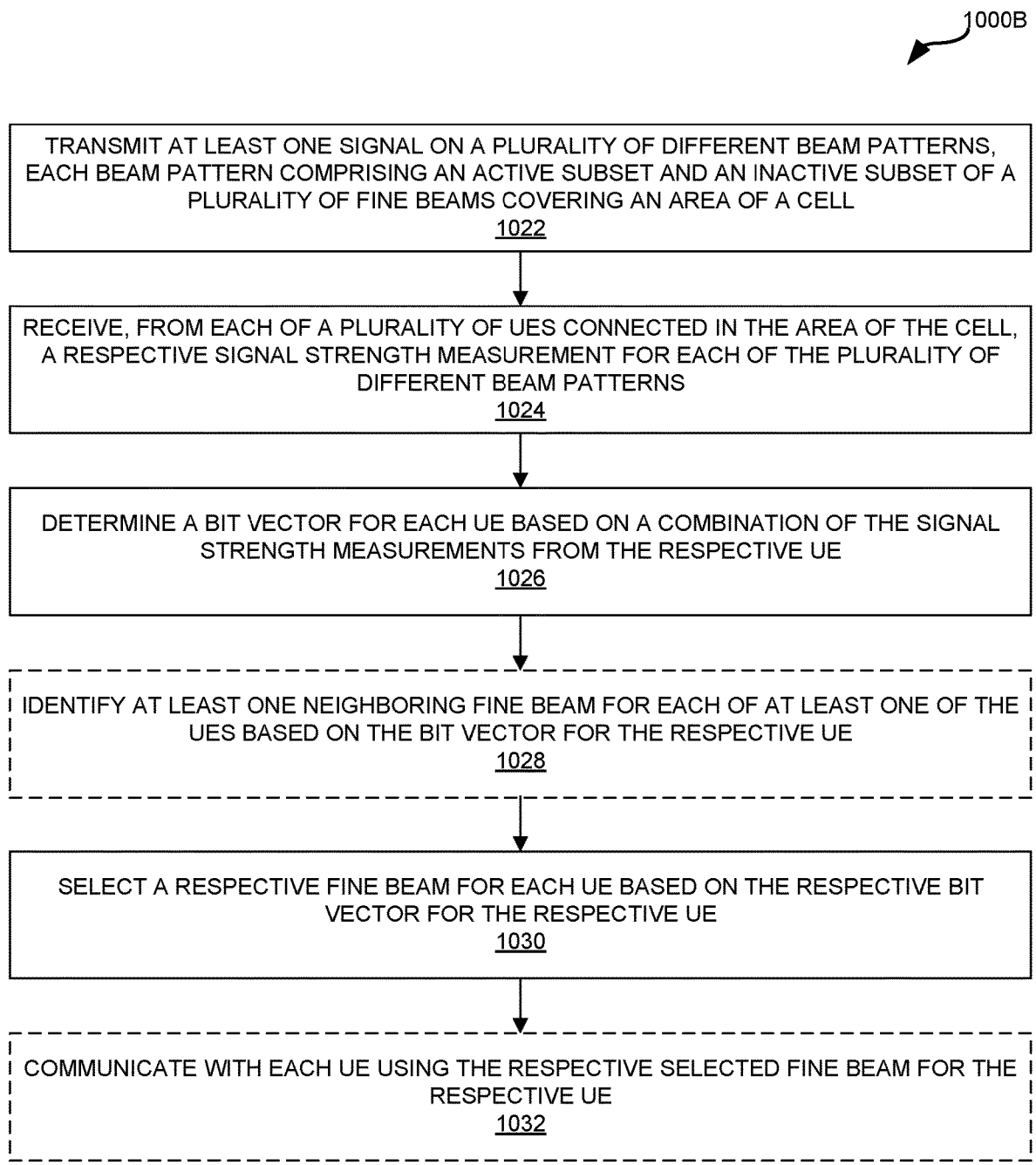
FIG. 10B is a flow diagram illustrating another example method for beam tracking in a base station, e.g., a gNB.

FIG. 10B is a flow diagram illustrating a method 1000B for beam tracking in a base station, e.g., a gNB 100. The method 1000B may be performed, at least in part, by a C-RAN implementing a gNB 100 and using a 5G air interface to communicate with UEs 112 in an area 122 of a cell 102. For example, the method 1000B may be performed by UE(s) 112, CU(s) 104, DU(s) 106, and/or RU(s) 108. The cell area 122 may be covered by N (e.g., 16, 64, 256, etc.) fine beams 120 transmitted from the gNB 100, e.g., from one or more RUs 108. In some configurations, some of the steps in the method 1000B of FIG. 10B may be similar or identical to steps in the method 1000A of FIG. 10A.

The blocks of the flow diagram shown in FIG. 10B have been arranged in a generally sequential manner for ease of explanation; however, it is to be understood that this arrangement is merely exemplary, and it should be recognized that the processing associated with method 1000B (and the blocks shown in FIG. 10B) can occur in a different order (for example, where at least some of the processing associated with the blocks is performed in parallel and/or in an event-driven manner). Also, most standard exception handling is not described for ease of explanation; however, it is to be understood that method 1000B can and typically would include such exception handling.

The method 1000B begins at step 1022 where the gNB 100 transmits at least one signal on a plurality of different beam patterns 124, each beam pattern 124 comprising an active subset and an inactive subset of a plurality of fine beams 120 covering an area 122 of a cell 102. For a given beam pattern 124, the active fine beams 120 may be used to transmit one of the signal(s) during a time resource associated with the beam pattern 124, and the inactive beams 120 are not used to transmit any of the signals during the time resource in some configurations. The N fine beams 120 may originate from a single RU 108 or across multiple RUs 108. In some examples, at least $\log_2(N)$ beam patterns 124 are used to select one of N fine beams 120 that cover an area 122 of a cell 102.

In a first example, at least two different types of signals are transmitted using different beam patterns 124. For example, Synchronization Signal Blocks (SSBs) can be transmitted using the active fine beams 120 in a first subset of the beam patterns 124 (e.g., SSB beam patterns 124E-H) and Channel State Information Reference Signal (CSI-RSs) can be transmitted using the active fine beams 120 in a second subset of the beam patterns 124 (e.g., using the "A" tracking beam patterns 124A-D and, optionally, the "B" tracking beam patterns 124I-L).

In a second example, the same type of signal is transmitted using every beam patterns 124. For example, Synchronization Signal Blocks (SSBs) can be transmitted using the active fine beams 120 in all beam patterns 124.

The method 1000B proceeds at step 1024 where the gNB 100 (e.g., RU(s) 108) receives, from each of a plurality of UEs 112 in the area 122 of the cell 102, a respective signal strength measurement for each of the plurality of different beam patterns 124. For example, each signal strength measurement may be a Signal-to-Interference-plus-Noise Ratio (SINR) for a received signal (transmitted using one of the beam patterns 124), however, any suitable signal strength metric may be used, e.g., received signal strength indicator (RSSI), Signal-to-noise ratio (SNR), etc.

The number of signal strength measurements (and the number (M) of beam patterns 124) may be less than the number (N) of fine beams 120 covering the area 122 of the cell 102. For example, if the area 122 of the cell 102 was covered by 64 fine beams 120 and the second set of beam patterns 124A-H (in FIG. 5) was used, each UE 112 may report 8 signal strength measurements. Alternatively, if the area 122 of the cell 102 was covered by 64 fine beams 120 and the second set of beam patterns 124A-H (in FIG. 5) combined with the third set of beam patterns 124I-L (in FIG. 7) was used, each UE 112 may report 12 signal strength measurements. Alternatively, if the area 122 of the cell 102 was covered by 16 fine beams 120 and the fourth set of beam patterns 124M-S was used, each UE 112 may report 7 signal strength measurements. However, it should be noted that any suitable number of fine beams 120 and beam patterns 124 (and corresponding signal strength measurements) could be used.

The method 1000B proceeds at step 1026 where the gNB 100 (e.g., CU(s) 104 and/or DU(s) 106) determines a bit vector for each UE 112 based on a combination of the signal strength measurements from the respective UE 112. For example, the bit vector for each UE 112 may include a bit for each signal strength measurement.

The gNB 100 may compare each of a UE's signal strength measurements to a threshold to determine the bits in the bit vector for the UE 112. In some examples, a "1" may be assigned in a corresponding bit position for signal strength measurements (e.g., an SINR) that are greater than or equal to the threshold, and a "0" may be assigned in a corresponding bit position for signal strength measurements (e.g., an SINR) that are less than the threshold. In some examples, the threshold is based on the maximum value in the set of UE measurements for one or more (e.g., all) UEs 112, e.g., max{measurements}−3 dB. In some examples, the same threshold is used for every measurement, but other configurations are possible.

As previously described, the number of beam patterns 124 used (M) may be equal to (1) the number of UE measurements taken by each UE 112; and (2) the number of bit positions in each bit vector, e.g., where M>=log 2(N) (log 2(N) is the minimum number of beam patterns 124 to track N fine beams 120). However, other configurations are possible. Therefore, in some configurations, each beam pattern 124 may map to a specific bit position in the bit vectors, e.g., the number of bits allocated to the signal strength measurement, from a particular UE 112, for each of M beam patterns 124 maps to one of M bits in a bit vector for the particular UE 112.

The method 1000B proceeds at optional step 1028 where the gNB 100 (e.g., CU(s) 104 and/or DU(s) 106) identifies at least one neighboring fine beam 120 for each of at least one of the UEs 112 based on the bit vector for the respective UE 112. For example, neighboring fine beam 120 identification may be performed for binary coding examples. For example, optional step 1028 may be performed when the gNB 100 transmits a set of beam patterns 124 where a first subset of the beam patterns 124 are complements of a second subset of the beam patterns 124. For example, the example sets of beam patterns 124 in FIGS. 5 and 7 could be used in combination because the "A" tracking beam patterns 124A-D (corresponding to the YYYY bits of a XXXXYYYY-ZZZZ bit vector) are complementary of the "B" tracking beam patterns 124I-L (corresponding to the ZZZZ bits of a XXXXYYYY-ZZZZ bit vector).

In some examples, optional step 1028 is only performed when a first subset of bits in the bit vector (e.g., the YYYY bits) are not complementary of (e.g., the bitwise NOT of) a second subset of bits in the bit vector (e.g., the ZZZZ bits). For example, optional step 1028 may only be performed in response to the gNB 100 determining that a first subset of bits in the bit vector (at a first set of bit positions) are not complementary of a second subset of bits in the bit vector (at a second set of bit positions) because this would indicate that multiple fine beams 120 are visible (received with a signal strength equal or greater than a threshold) at the UE 112.

In some examples, at least one neighboring fine beam 120 is identified for a UE 112 by inverting some or all of the bits in the UE's bit vector and combining (e.g., replacing and/or concatenating to) the inverted bits with at least a portion of the UE's bit vector, then using the resulting new bit vector to determine the neighboring fine beam(s) 120, e.g., with a lookup table. For example, the gNB 100 may invert a subset of bits in a UE's bit vector (e.g., where the bit vector is associated with the selected fine beam 120 for that UE 112), then replace certain bits in the bit vector to produce a new bit vector that identifies the neighboring fine beam 120.

For example, where a gNB 100 uses the second and third example sets of beam patterns 124 in FIGS. 5 and 7, respectively, a UE 112 situated between fine beams with bit vectors of XXXX1001 and XXXX1011 (e.g., in FIGS. 6A-C) will have a bit vector equivalent to the bitwise OR of those two bit vectors: XXXX1011-0110. The gNB 100 can identify the neighboring fine beam 120 seen by the UE 112 (XXXX1001) using the complementary bits (bits following the dash: 0110), which indicate that the fine beam 120 associated with bit vector XXXX1001 is also visible at the UE 112 (in addition to the fine beam 120 associated with the bit vector XXXX1011).

Specifically, the complement (bitwise NOT) of the ZZZZ complementary bits (of a XXXXYYYY-ZZZZ bit vector) are combined with (e.g., concatenated to the end of) the first four quadrant bits (XXXX) of the UE's bit vector (with or without adding ZZZZ bits) to identify a new bit vector and corresponding neighboring fine beam 120 seen by the UE 112, e.g., the complement of 0110 in the example above is 1001, so the UE 112 also sees the neighboring fine beam 120 associated with the new bit vector XXXX1001. In other words, the complement (bitwise NOT) of the complementary bits (0110 in the example above) would match bits $b_0$-$b_3$ (the YYYY bits of a the XXXXYYYY-ZZZZ bit vector) of another fine beam 120 seen by the UE 112, thus identifying neighboring fine beam 120 associated with bit vector XXXX1001 in this example.

The method 1000B proceeds at step 1030 where the gNB 100 (e.g., CU(s) 104 and/or DU(s) 106) selects a respective fine beam 120 for each UE 112 based on the respective bit vector for the respective UE 112. For example, the gNB 100 may use a lookup table or other data structure to select the fine beam 120 for a UE 112 associated with the bit vector for the UE 112. For example, a lookup table may include a list of all the bit vectors, each with an associated fine beam 120 identifier.

When the UE 112 sees multiple neighboring fine beams 120 (at a signal strength equal to or greater than a threshold), the UE's bit vector may point to one of the multiple neighboring fine beams 120. In this case, the selected fine beam 120 may or may not be received with the highest signal strength, e.g., the UE's bit vector will typically be the bitwise OR of the bit vectors associated with all of the multiple neighboring fine beams 120 the UE 112 sees (at a signal strength equal to or greater than the threshold). However, all multiple neighboring fine beams 120 seen by the UE 112 will typically be received at nearly the same signal strength, such that any of the multiple neighboring fine beams 120 can be used for the UE 112.

The method 1000B proceeds at optional step 1032 where the gNB 100 communicates with each UE 112 using the respective selected fine beam 120 for the respective UE 112. For example, the gNB 100 may transmit data to (in the downlink) and receives data from (in the uplink) the UE 112 only using the fine beam 120 determined for that UE 112 until a new fine beam 120 is selected for the UE 112 or the UE 112 disconnects from the cell 102 (and excluding broadcast signals to more than one UE 112 connected to the cell 102). Optionally, the gNB 100 may communicate with each at least one of the UEs 112 on the respective at least one neighboring fine beam 120 (from step 1028) in addition to or instead of the selected fine beam 120 for the respective UE 112 (from step 1030).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLES

Example 1 includes a system, comprising: a plurality of remote units (RUs), wherein at least one of the RUs is configured to: transmit at least one signal on a plurality of different beam patterns, each beam pattern comprising an active subset and an inactive subset of a plurality of fine beams covering an area of a cell; and receive, from each of a plurality of user equipment (UEs) in the area of the cell, a respective signal strength measurement for each of the plurality of different beam patterns; a centralized unit communicatively coupled to the plurality of RUs via a fronthaul interface, wherein the centralized unit is configured to: determine a bit vector for each UE based on a combination of the signal strength measurements from the respective UE; and select a respective fine beam for each UE based on the respective bit vector for the UE.

Example 2 includes the system of Example 1, wherein the centralized unit is a Distributed Unit (DU) or a Central Unit (CU) configured to operate in a 3GPP Fifth Generation communication system.

Example 3 includes the system of any of Examples 1-2, wherein the system is configured to communicate with the plurality of UEs using a Fifth Generation New Radio (5G NR) wireless interface.

Example 4 includes the system of any of Examples 1-3, wherein the transmitting the at least one signal comprises transmitting a respective Synchronization Signal Block (SSB) using the active subset of fine beams in each of a first subset of the beam patterns and transmitting a respective Channel State Information Reference Signal (CSI-RS) using the active subset of fine beams in each of a second subset of the beam patterns.

Example 5 includes the system of any of Examples 1-4, wherein the transmitting the at least one signal comprises transmitting a respective Synchronization Signal Block (SSB) using the active subset of fine beams in each of the beam patterns.

Example 6 includes the system of any of Examples 1-5, wherein the system implements N directional fine beams, each covering a sub-area in the area of the cell.

Example 7 includes the system of Example 6, wherein N is greater in quantity than the beam patterns.

Example 8 includes the system of any of Examples 1-7, wherein each of the at least one signal is transmitted in a respective time resource.

Example 9 includes the system of any of Examples 1-8, wherein each signal strength measurement is a Signal-to- Interference-plus-Noise Ratio (SINR) for one of the at least one signal received at a respective UE.

Example 10 includes the system of any of Examples 1-9, wherein every beam pattern maps to a respective bit position in the bit vectors.

Example 11 includes the system of Example 10, wherein each of a subset of bits in the bit vector also acts as a respective parity bit that is used to detect or detect and correct at least one error in the bit vector.

Example 12 includes the system of any of Examples 1-11, wherein the system is configured to communicate with each UE using the respective selected fine beam for the respective UE until a new fine beam is selected for the respective UE or the respective UE disconnects from the cell.

Example 13 includes the system of any of Examples 1-12, wherein the at least one of the RUs is configured to use analog beamforming to form the fine beams by applying phase and relative amplitude weights in radio frequency (RF) front-end circuitry of the at least one of the RUs.

Example 14 includes the system of any of Examples 1-13, wherein the centralized unit is configured to determine the bit vector for each UE by comparing a respective UE's signal strength measurements to a threshold to determine corresponding bits in the bit vector for the respective UE, wherein: a 1 is assigned for a corresponding bit when a signal strength measurement is greater than or equal to the threshold; and a 0 is assigned for the corresponding bit when the signal strength measurement is less than the threshold.

Example 15 includes the system of any of Examples 1-14, wherein a bitwise OR of bit vectors of neighboring fine beams is a new bit vector that maps to one of the neighboring fine beams.

Example 16 includes the system of any of Examples 1-15, wherein the centralized unit is configured to identify at least one neighboring fine beam for each of at least one of the UEs based on the bit vector for the respective UE.

Example 17 includes the system of Example 16, wherein the identifying comprises: inverting a subset of bits in the bit vector for the respective UE; combining the inverted bits with at least some of the bits in the bit vector to form a new bit vector; and identifying the at least one fine beam for the respective UE based on the new bit vector.

Example 18 includes the system of Example 17, wherein the centralized unit is configured to identify the at least one neighboring fine beam for each of the at least one UE in response to determining that a first subset of the bits in the respective UE's bit vector are not complementary of a second subset of the bits in the respective UE's bit vector.

Example 19 includes a method, comprising: transmitting at least one signal on a plurality of different beam patterns, each beam pattern comprising an active subset and an inactive subset of a plurality of fine beams covering an area of a cell; receiving, from each of a plurality of user equipment (UEs) in the area of the cell, a respective signal strength measurement for each of the plurality of different beam patterns; determining a bit vector for each UE based on a combination of the signal strength measurements from the respective UE; and selecting a respective fine beam for each UE based on the respective bit vector for the UE.

Example 20 includes the method of Example 19, wherein the method is performed by a system comprising: a plurality of remote units (RUs); and a centralized unit communicatively coupled to the plurality of RUs via a fronthaul interface, wherein the centralized unit is a Distributed Unit (DU) or a Central Unit (CU) configured to operate in a 3GPP Fifth Generation communication system.

Example 21 includes the method of any of Examples 19-20, further comprising communicating with the plurality of UEs using a Fifth Generation New Radio (5G NR) wireless interface.

Example 22 includes the method of any of Examples 19-21, wherein the transmitting the at least one signal comprises transmitting a respective Synchronization Signal Block (SSB) using the active subset of fine beams in each of a first subset of the beam patterns and transmitting a respective Channel State Information Reference Signal (CSI-RS) using the active subset of fine beams in each of a second subset of the beam patterns.

Example 23 includes the method of any of Examples 19-22, wherein the transmitting the at least one signal comprises transmitting a respective Synchronization Signal Block (SSB) using the active subset of fine beams in each of the beam patterns.

Example 24 includes the method of any of Examples 19-23, wherein the plurality of fine beams includes N directional fine beams, each covering a sub-area in the area of the cell.

Example 25 includes the method of Example 24, wherein N is greater in quantity than the beam patterns.

Example 26 includes the method of any of Examples 19-25, wherein each of the at least one signal is transmitted in a respective time resource.

Example 27 includes the method of any of Examples 19-26, wherein each signal strength measurement is a Signal-to-Interference-plus-Noise Ratio (SINR) for one of the at least one signal received at a respective UE.

Example 28 includes the method of any of Examples 19-27, wherein every beam pattern maps to a respective bit position in the bit vectors.

Example 29 includes the method of Example 28, wherein each of a subset of bits in the bit vector also acts as a respective parity bit that is used to detect or detect and correct at least one error in the bit vector.

Example 30 includes the method of any of Examples 19-29, further comprising communicating with each UE using the respective selected fine beam for the respective UE until a new fine beam is selected for the respective UE or the respective UE disconnects from the cell.

Example 31 includes the method of any of Examples 19-30, wherein the transmitting the at least one signal on the plurality of different beam patterns comprises analog beamforming to form the fine beams by applying phase and relative amplitude weights in radio frequency (RF) front-end circuitry.

Example 32 includes the method of any of Examples 19-31, wherein the determining the bit vector for each UE comprises comparing a respective UE's signal strength measurements to a threshold to determine corresponding bits in the bit vector for the respective UE, wherein: a 1 is assigned for a corresponding bit when a signal strength measurement is greater than or equal to the threshold; and a 0 is assigned for the corresponding bit when the signal strength measurement is less than the threshold.

Example 33 includes the method of any of Examples 19-32, wherein a bitwise OR of bit vectors of neighboring fine beams is a new bit vector that maps to one of the neighboring fine beams.

Example 34 includes the method of any of Examples 19-33, further comprising identifying at least one neighboring fine beam for each of at least one of the UEs based on the bit vector for the respective UE.

Example 35 includes the method of Example 34, wherein the identifying comprises: inverting a subset of bits in the bit vector for the respective UE; combining the inverted bits with at least some of the bits in the bit vector to form a new bit vector; and identifying the at least one fine beam for the respective UE based on the new bit vector.

Example 36 includes the method of Example 35, wherein the identifying the at least one neighboring fine beam for each of the at least one UE is performed in response to determining that a first subset of the bits in the respective UE's bit vector are not complementary of a second subset of the bits in the respective UE's bit vector.

The invention claimed is:

1. A system, comprising:
a plurality of remote units (RUs), wherein at least one of the RUs is configured to:
transmit at least one signal on each of a plurality of different beam patterns, each of the plurality of different beam patterns comprising a respective active subset of a plurality of fine beams, the plurality of fine beams covering an area of a cell; and
receive, from each of a plurality of user equipment (UEs) in the area of the cell, a respective signal strength measurement for each of the plurality of different beam patterns, wherein a number of the plurality of different beam patterns is less than a number of the plurality of fine beams covering the area of the cell;
a centralized unit communicatively coupled to the plurality of RUs via a fronthaul interface, wherein the centralized unit is configured to:
determine a bit vector for each UE based on a combination of the signal strength measurements from the respective UE; and
select a respective fine beam for each UE based on the respective bit vector for the UE.

2. The system of claim 1, wherein the centralized unit is a Distributed Unit (DU) or a Central Unit (CU) configured to operate in a 3rd Generation Partnership Project (3GPP) Fifth Generation communication system.

3. The system of claim 1, wherein the system is configured to communicate with the plurality of UEs using a Fifth Generation New Radio (5G NR) wireless interface.

4. The system of claim 1, wherein the transmitting the at least one signal comprises transmitting a respective Synchronization Signal Block (SSB) using the active subset of fine beams in each of a first subset of the beam patterns and transmitting a respective Channel State Information Reference Signal (CSI-RS) using the active subset of fine beams in each of a second subset of the beam patterns.

5. The system of claim 1, wherein the transmitting the at least one signal comprises transmitting a respective Synchronization Signal Block (SSB) using the active subset of fine beams in each of the beam patterns.

6. The system of claim 1, wherein the system implements N directional fine beams, each covering a sub-area in the area of the cell.

7. The system of claim 6, wherein N is greater in quantity than the beam patterns.

8. The system of claim 1, wherein each of the at least one signal is transmitted in a respective time resource.

9. The system of claim 1, wherein each signal strength measurement is a Signal-to-Interference-plus-Noise Ratio (SINR) for one of the at least one signal received at a respective UE.

10. The system of claim 1, wherein every beam pattern maps to a respective bit position in the bit vectors.

11. The system of claim 10, wherein each of a subset of bits in the bit vector also acts as a respective parity bit that is used to detect or detect and correct at least one error in the bit vector.

12. The system of claim 1, wherein the system is configured to communicate with each UE using the respective selected fine beam for the respective UE until a new fine beam is selected for the respective UE or the respective UE disconnects from the cell.

13. The system of claim 1, wherein the at least one of the RUs is configured to use analog beamforming to form the fine beams by applying phase and relative amplitude weights in radio frequency (RF) front-end circuitry of the at least one of the RUs.

14. The system of claim 1, wherein the centralized unit is configured to determine the bit vector for each UE by comparing a respective UE's signal strength measurements to a threshold to determine corresponding bits in the bit vector for the respective UE, wherein:
a 1 is assigned for a corresponding bit when a signal strength measurement is greater than or equal to the threshold; and
a 0 is assigned for the corresponding bit when the signal strength measurement is less than the threshold.

15. The system of claim 1, wherein a bitwise OR of bit vectors of neighboring fine beams is a new bit vector that maps to one of the neighboring fine beams.

16. The system of claim 1, wherein the centralized unit is configured to identify at least one neighboring fine beam for each of at least one of the UEs based on the bit vector for the respective UE.

17. The system of claim 16, wherein the identifying comprises:
inverting a subset of bits in the bit vector for the respective UE;
combining the inverted bits with at least some of the bits in the bit vector to form a new bit vector; and
identifying the at least one fine beam for the respective UE based on the new bit vector.

18. The system of claim 17, wherein the centralized unit is configured to identify the at least one neighboring fine beam for each of the at least one UE in response to determining that a first subset of the bits in the respective UE's bit vector are not complementary of a second subset of the bits in the respective UE's bit vector.

19. A method, comprising:
transmitting at least one signal on each of a plurality of different beam patterns, each of the plurality of different beam patterns comprising a respective active subset of a plurality of fine beams, the plurality of fine beams covering an area of a cell;
receiving, from each of a plurality of user equipment (UEs) in the area of the cell, a respective signal strength measurement for each of the plurality of different beam patterns, wherein a number of the plurality of different beam patterns is less than a number of the plurality of fine beams covering the area of the cell;
determining a bit vector for each UE based on a combination of the signal strength measurements from the respective UE; and
selecting a respective fine beam for each UE based on the respective bit vector for the UE.

20. The method of claim 19, wherein the method is performed by a system comprising:
a plurality of remote units (RUs); and
a centralized unit communicatively coupled to the plurality of RUs via a fronthaul interface, wherein the centralized unit is a Distributed Unit (DU) or a Central Unit (CU) configured to operate in a 3rd Generation Partnership Project (3GPP) Fifth Generation communication system.

21. The method of claim 19, further comprising communicating with the plurality of UEs using a Fifth Generation New Radio (5G NR) wireless interface.

22. The method of claim 19, wherein the transmitting the at least one signal comprises transmitting a respective Synchronization Signal Block (SSB) using the active subset of fine beams in each of a first subset of the beam patterns and transmitting a respective Channel State Information Reference Signal (CSI-RS) using the active subset of fine beams in each of a second subset of the beam patterns.

23. The method of claim 19, wherein the transmitting the at least one signal comprises transmitting a respective Synchronization Signal Block (SSB) using the active subset of fine beams in each of the beam patterns.

24. The method of claim 19, wherein the plurality of fine beams includes N directional fine beams, each covering a sub-area in the area of the cell.

25. The method of claim 24, wherein N is greater in quantity than the beam patterns.

26. The method of claim 19, wherein each of the at least one signal is transmitted in a respective time resource.

27. The method of claim 19, wherein each signal strength measurement is a Signal-to-Interference-plus-Noise Ratio (SINR) for one of the at least one signal received at a respective UE.

28. The method of claim 19, wherein every beam pattern maps to a respective bit position in the bit vectors.

29. The method of claim 28, wherein each of a subset of bits in the bit vector also acts as a respective parity bit that is used to detect or detect and correct at least one error in the bit vector.

30. The method of claim 19, further comprising communicating with each UE using the respective selected fine beam for the respective UE until a new fine beam is selected for the respective UE or the respective UE disconnects from the cell.

31. The method of claim 19, wherein the transmitting the at least one signal on the plurality of different beam patterns comprises analog beamforming to form the fine beams by applying phase and relative amplitude weights in radio frequency (RF) front-end circuitry.

32. The method of claim 19, wherein the determining the bit vector for each UE comprises comparing a respective UE's signal strength measurements to a threshold to determine corresponding bits in the bit vector for the respective UE, wherein:
  a 1 is assigned for a corresponding bit when a signal strength measurement is greater than or equal to the threshold; and
  a 0 is assigned for the corresponding bit when the signal strength measurement is less than the threshold.

33. The method of claim 19, wherein a bitwise OR of bit vectors of neighboring fine beams is a new bit vector that maps to one of the neighboring fine beams.

34. The method of claim 19, further comprising identifying at least one neighboring fine beam for each of at least one of the UEs based on the bit vector for the respective UE.

35. The method of claim 34, wherein the identifying comprises:
  inverting a subset of bits in the bit vector for the respective UE;
  combining the inverted bits with at least some of the bits in the bit vector to form a new bit vector; and
  identifying the at least one fine beam for the respective UE based on the new bit vector.

36. The method of claim 35, wherein the identifying the at least one neighboring fine beam for each of the at least one UE is performed in response to determining that a first subset of the bits in the respective UE's bit vector are not complementary of a second subset of the bits in the respective UE's bit vector.

* * * * *